(12) United States Patent
Wu et al.

(10) Patent No.: US 6,853,684 B2
(45) Date of Patent: *Feb. 8, 2005

(54) DIGITAL SUM VARIATION COMPUTATION METHOD AND SYSTEM

(75) Inventors: Wen-Yi Wu, Chupei (TW); Jyh-Shin Pan, Hsinchu Hsien (TW)

(73) Assignee: MediaTek Inc., Hsinchu (TW)

( * ) Notice: Subject to any disclaimer, the term of this patent is extended or adjusted under 35 U.S.C. 154(b) by 39 days.

This patent is subject to a terminal disclaimer.

(21) Appl. No.: 10/370,261

(22) Filed: Feb. 19, 2003

(65) Prior Publication Data

US 2003/0128775 A1 Jul. 10, 2003

Related U.S. Application Data

(63) Continuation of application No. 09/494,176, filed on Jan. 31, 2000, now Pat. No. 6,542,452.

(30) Foreign Application Priority Data

Oct. 2, 1999 (TW) .......................... 88117002 A

(51) Int. Cl.[7] .......................... H04L 25/00; G11B 20/10; H03M 5/00
(52) U.S. Cl. ...................... 375/253; 369/59.23; 341/58; 341/59
(58) Field of Search .................... 375/242, 246, 375/253; 369/59.1–59.24; 341/59, 58, 68

(56) References Cited

U.S. PATENT DOCUMENTS

| 5,077,721 A | * | 12/1991 | Sako et al. | 369/59.26 |
| 5,333,126 A | * | 7/1994 | Fukuda et al. | 369/59.24 |
| 5,375,249 A | * | 12/1994 | Cho | 369/59.23 |
| 5,696,505 A | * | 12/1997 | Schouhamer Immink | 341/59 |
| 5,781,131 A | * | 7/1998 | Shimpuku et al. | 341/58 |
| 5,790,056 A | * | 8/1998 | Schouhamer Immink | 341/58 |
| 5,818,367 A | * | 10/1998 | Okazaki et al. | 341/106 |
| 5,870,037 A | * | 2/1999 | Okazaki et al. | 341/58 |
| 5,912,869 A | * | 6/1999 | Tanaka et al. | 369/59.23 |
| 5,920,272 A | * | 7/1999 | Schouhamer Immink | 341/59 |
| 5,969,651 A | * | 10/1999 | Okazaki et al. | 341/106 |
| 6,023,234 A | * | 2/2000 | Fukuoka | 341/58 |
| 6,297,753 B1 | * | 10/2001 | Hayami | 341/59 |
| 6,542,452 B1 | * | 4/2003 | Wu et al. | 369/59.24 |
| 6,604,219 B1 | * | 8/2003 | Lee et al. | 714/769 |

* cited by examiner

Primary Examiner—Tesfaldet Bocure
(74) Attorney, Agent, or Firm—J.C. Patents

(57) ABSTRACT

A digital sum variation (DSV) computation method and system is proposed, which is capable of determining the DSV value of a bit stream of channel-bit symbols to thereby find the optimal merge-bit symbol for insertion between each succeeding pair of the channel-bit symbols. This DSV computation method and system is characterized in the use of a Zero Digital Sum Variation (ZDSV) principle to determine the DSV. This DSV computation method and system can find the optimal merge-bit symbol for insertion between each succeeding pair of the channel-bit symbols in a more cost-effective manner with the need for a reduced amount of memory and utilizes a lookup table requiring a reduced amount of memory space for storage so that memory space can be reduced as compared to the prior art. This DSV computation method and system is therefore more advantageous to use than the prior art.

11 Claims, 10 Drawing Sheets

US 6,853,684 B2

DIGITAL SUM VARIATION COMPUTATION METHOD AND SYSTEM

CROSS-REFERENCE TO RELATED APPLICATION

This application is a continuation application of, and claims the priority benefit of, U.S. application Ser. No. 09/494,176 filed on Jan. 31, 2000, now U.S. Pat. No. 6,542,452 issued on Apr. 1, 2003.

BACKGROUND OF THE INVENTION

1. Field of the Invention

This invention relates to digital technology, and more particularly, to a digital sum variation (DSV) computation method and system which is capable of determining the DSV value of a bit stream of channel-bit symbols to thereby find the optimal merge-bit symbol for insertion between each succeeding pair of the channel-bit symbols.

2. Description of Related Art

In a CD (compact disc) system, analog audio signals are processed through sampling and analog-to-digital conversion into a stream of digital data. Typically, the digital data are formatted into 16-bit words, with each word consisting of two bytes. By convention, each byte of the digital data is referred to as a symbol. These digital data are then written onto a CD. There exist, however, some problems when reading these digital data from the CD if these data are directly written onto the CD without further processing.

Conventionally, these digital data should be further processed through the what is known as an eight-to-fourteen modulation (EFM) to convert each 8-bit symbol into a 14-bit data length called channel bits each set of channel bits is hereinafter referred to as a channel-bit symbol. The EFM process is achieved through the use of a lookup table. The length of each channel-bit symbol should be compliant with the specified run length of the CD driver between 3 bits and 11 bits.

During a write operation, it is possible that the current channel-bit symbol and the next one are not compliant with the specified run length. One solution to this problem is to insert 3 bits, called merge bits, between each succeeding pair of channel-bit symbols, so as to ensure that all the data written onto the CD are absolutely compliant with the run length.

There are four merge-bit symbols (000), (001), (010), and (100) which can be selected for insertion between each succeeding pair of channel-bit symbols; through computation, the optimal merge-bit symbol can be found for the insertion.

During write operation, a pit is formed in the CD surface for each change of binary value. During read operation, the CD driver can produce a what is known as a Non-Return-to-Zero-and-Invert (NRZI) signal based on the pattern of the pits on the CD.

FIG. 1 is a schematic diagram used to depict the generation of an NRZI signal and a bit stream from a pattern of pits on a CD. During the read, when a pit is encountered, it represents a logic change from 0 to 1 or from 1 to 0. The starting logic voltage state for the NRZI signal can be either LOW or HIGH. In the example of FIG. 1, the NRZI signal waveform (I) has a LOW starting logic voltage state, whereas the NRZI signal waveform (II) has a HIGH starting logic voltage state. In either case, the CD driver can produce a bit stream of channel-bit symbols ($efm_1$, $efm_2$, $efm_3$) and a number of merge-bit symbols ($m_1$, $m_2$, $m_3$) each being inserted between one succeeding pair of the channel-bit symbols. The merge-bit symbols ($m_1$, $m_2$, $m_3$) can be removed later to obtain the channel-bit symbols ($efm_1$, $efm_2$, $efm_3$) which are then processed through reverse EFM to recover the original 8-bit symbols ($SYM_1$, $SYM_2$, $SYM_3$).

In the case of the NRZI signal waveform (I), whose starting logic voltage state is LOW, its digital sum variation (DSV), here represented by $DSV_1$, can be computed as follows: since $efm_1$=(01001000100000), the $DSV_1$ value at $t_0$ is 0; subsequently, since the first bit 0 is at the LOW state, the $DSV_1$ value becomes −1; subsequently, since the next three bits 100 are at the HIGH state, the $DSV_1$ value becomes −1+3=+2; subsequently, since the next four bits 1000 are at the LOW state, the $DSV_1$ value becomes +2−4=−2; and subsequently, since the next six bits 1000000 are at the HIGH state, the $DSV_1$ value becomes −2+6=+4.

Subsequently at $t_2$ (i.e., at the end of $m_2$), the $DSV_1$ value becomes +5; at $t_3$ (i.e., at the end of $efm_2$), the $DSV_1$ value becomes −3; at $t_4$ (i.e., at the end of $m_3$), the $DSV_1$ value becomes −2; at $t_5$ (i.e., at the end of $efm_3$), the $DSV_1$ value becomes 0. The DSV for the NRZI signal waveform (II), here denoted by $DSV_2$, is simply the negative of the $DSV_1$ value, i.e., $DSV_2$=−$DSV_1$ at any time point.

What is described above is how the pattern of pits on a CD can be converted into a stream of bit data during read operation. The encoding of the original digital data through EFM with insertion of merge bits before being written onto the CD is rather complex in procedure. The U.S. Pat. No. 5,375,249 entitled "EIGHT-TO-FOURTEEN-MODULATION CIRCUIT FOR A DIGITAL AUDIO DISC SYSTEM" issued on Dec. 20, 1994 discloses a method for finding the optimal merge-bit symbol through the use of DSV. This patented method is briefly depicted in the following with reference to FIG. 2.

Referring to FIG. 2, after $efm_1$ and $efm_2$ are obtained, four bit streams are obtained by inserting each of the following four merge-bit symbols: (000), (001), (010), and (100), between $efm_1$ and $efm_2$. After this, the respective DSV values for these four bit streams are computed, which are respectively denoted by $DSV_1$, $DSV_2$, $DSV_3$, and $DSV_4$.

Next, whether the length of the merge bits inserted between $efm_1$ and $efm_2$ exceeds the specified run length is checked; if the length is exceeded, these merge bits are inhibited from insertion between $efm_1$ and $efm_2$. To do this, a check is conducted for each of the four bit streams as to whether the number of consecutive 0s between the last 1 and the next 1 in $efm_1$ exceeds the run length, and whether the number of consecutive 0s between the first 1 and the preceding 1 in $efm_2$ exceeds the run length.

In the example of FIG. 2, $efm_1$=(01001000100000), $efm_2$ =(00100100000000), and $efm_3$=(01000001000000). Then, the insertion of each of the four merge-bit symbols: $m_1$=(000), $m_2$=(001), $m_3$=(010), and $m_4$=(100), between $efm_1$ and $efm_2$ results in four bit streams, with $DSV_1$=+15, $DSV_2$=−3, $DSV_3$=−5, and $DSV_4$=−7, where $DSV_1$ is the DSV of the bit stream ($efm_1$, $m_1$, $efm_2$); $DSV_2$ is the DSV of the bit stream ($efm_1$, $m_2$, $efm_2$); $DSV_3$ is the DSV of the bit stream ($efm_1$, $m_3$, $efm_2$); and $DSV_4$ is the DSV of the bit stream ($efm_1$, $m_4$, $efm_2$). Among these DSV values, $DSV_2$=−3 is closest to 0, and the associated merge-bit symbol $m_2$=(001) is therefore chosen for insertion between $efm_1$ and $efm_2$.

In a similar manner, for $efm_2$ and $efm_3$, the DSV value of −8 can be obtained for the bit stream ($efm_2$, $m_1$, $efm_3$). The bit stream ($efm_2$, $m_2$, $efm_3$) is not compliant with the run length and is therefore disregarded the DSV value for the bit stream (efm$_2$, m$_3$, efm$_3$) is 0, and the DSV value for the bit stream (efm$_2$, m$_4$, efm$_3$) is 2. Among these DSV values, DSV=0 is closest to 0, and the associated merge-bit symbol m$_3$=(010) is therefore chosen for insertion between efm$_2$ and efm$_3$. An NRZI signal can be then obtained based on the resulting bit stream (efm$_2$, m$_3$, efm$_3$).

One drawback to the foregoing method, however, is that a large amount of memory space is required to implement the DSV-based algorithm for finding the optimal merge-bit symbol for insertion between each succeeding pair of the 14-bit channel-bit symbols. This is because that the method requires the storage of a lookup table used in the EFM process and the binary data of each 14-bit channel-bit symbols, which are quite memory-consuming. Moreover, the process for finding the optimal merge-bit symbol is quite complex in procedure, and requires a lengthy program to implement.

SUMMARY OF THE INVENTION

It is therefore an objective of this invention to provide a DSV computation method and system, which can find the optimal merge-bit symbol based on DSV in a more cost-effective manner with the need of a reduced amount of memory.

It is another objective of this invention to provide a DSV computation method and system, which utilizes a lookup table requiring a reduced amount of memory space for storage so that memory space can be reduced compared to the prior art.

In accordance with the foregoing and other objectives, the invention proposes a new DSV computation method and system. The DSV computation method and system of the invention is capable of determining the DSV value of a bit stream of channel-bit symbols to thereby find the optimal merge-bit symbol for insertion between each succeeding pair of the channel-bit symbols.

In terms of system, the invention comprises the following constituent parts: (a) an EFM processing unit for converting each original binary symbol into its corresponding channel-bit symbol; (b) a PDSV processing unit for processing each original binary symbol to obtain its channel-bit symbol PDSV; (c) a channel-bit symbol inhibit circuit, receiving the output channel-bit symbol from the EFM processing unit and under control of a m$_n$_SEL signal, for determining which one of the merge-bit symbols is invalid for compliance with a specified run length; (d) an ODD checking circuit, receiving the output channel-bit symbol from the EFM processing unit and under control of a m$_n$_SEL signal, for determining, based on a previous start-to-channel-bit ODD value, a number of start-to-channel-bit ODD values for the merge-bit symbols, respectively; (e) a DSV computation and search circuit, coupled to the PDSV processing unit and the ODD checking circuit, for computing for the respective DSV values corresponding to the merge-bit symbols based on the current start-to-channel-bit ODD, the PDSV, the previous start-to-channel-bit ODD, the previous ZDSV, which DSV computation and search circuit is under control of the channel-bit symbol inhibit circuit to eliminate any of the DSV values corresponding to an invalid merge-bit symbol determined by the channel-bit symbol inhibit circuit, the DSV computation and search circuit outputting an index signal indicative of the selected merge-bit symbol using as the optimal merge-bit symbol for insertion between the current channel-bit symbol and the previous channel-bit symbol; (f) a third buffer, coupled to the DSV computation and search circuit, for temporary storage of the previous start-to-channel-bit ODD; and (g) a second buffer, coupled to the DSV computation and search circuit, for temporary storage of the previous ZDSV.

In terms of method, the invention comprises the following steps: (1) fetching the current channel-bit symbol; and then, based on the starting logic voltage state of an NRZI signal, determining the PDSV and ODD of the current channel-bit symbol; (2) assigning the current channel-bit symbol PDSV as the previous channel-bit symbol ZDSV, and assigning the current channel-bit symbol ODD as the previous channel-bit symbol ODD; (3) fetching the next channel-bit symbol; and then, based on the starting logic voltage state of the NRZI signal, determining the PDSV and ODD of this channel-bit symbol; (4) from four merge-bit symbols including a first merge-bit symbol, a second merge-bit symbol, a third merge-bit symbol, and a fourth merge-bit symbol, selecting the first merge-bit symbol; and then determining the first merge-bit symbol PDSV and ODD; and then performing an XOR logic operation on the previous channel-bit symbol ODD and the first merge-bit symbol ODD to thereby obtain a start-to-the-first-merge-bit ODD; and then determining the ZDSV value for the first merge-bit symbol based on the previous channel-bit symbol ZDSV and the first PDSV; and then, in the case of the starting logic voltage state of the NRZI signal being LOW, determining the result of the first ZDSV plus the start-to-next-channel-bit ODD to thereby obtain a first DSV corresponding to the first merge-bit symbol; and while in the case of the starting logic voltage state of the NRZI signal being HIGH, determining the result of the first ZDSV minus the start-to-next-channel-bit ODD to thereby obtain a first DSV corresponding to the first merge-bit symbol; and then checking whether the resulting bit stream from the first merge-bit symbol exceeds a specified run length; if YES, eliminating the first DSV; (5) selecting the second merge-bit symbol; and then determining the second merge-bit symbol PDSV and ODD; and then performing an XOR logic operation on the previous channel-bit symbol ODD and the second merge-bit symbol ODD to thereby obtain a start-to-the-second-merge-bit ODD; and then determining the ZDSV value for the second merge-bit symbol based on the previous channel-bit symbol ZDSV and the second PDSV; and then, in the case of the starting logic voltage state of the NRZI signal being LOW, determining the result of the second ZDSV plus the start-to-next-channel-bit ODD to thereby obtain a second DSV corresponding to the second merge-bit symbol; and while in the case of the starting logic voltage state of the NRZI signal being HIGH, determining the result of the second ZDSV minus the start-to-next-channel-bit ODD to thereby obtain a second DSV corresponding to the second merge-bit symbol; and then checking whether the resulting bit stream from the second merge-bit symbol exceeds a specified run length; if YES, eliminating the second DSV; (6) selecting the third merge-bit symbol; and then determining the third merge-bit symbol PDSV and ODD; and then performing an XOR logic operation on the previous channel-bit symbol ODD and the third merge-bit symbol ODD to thereby obtain a start-to-the-third-merge-bit ODD; and then determining the ZDSV value for the third merge-bit symbol based on the previous channel-bit symbol ZDSV and the third PDSV; and then, in the case of the starting logic voltage state of the NRZI signal being LOW, determining the result of the third ZDSV plus the start-to-next-channel-bit ODD to thereby obtain a third DSV corresponding to the third merge-bit symbol; and while in the case of the starting logic voltage state of the NRZI signal being HIGH, determining the result of the third ZDSV minus the start-to-next-channel-bit ODD to thereby obtain a third DSV corresponding to the third merge-bit symbol; and then checking whether the resulting bit stream from the third merge-bit symbol exceeds a specified run length; if YES, eliminating the third DSV; (7) selecting the fourth merge-bit symbol; and then determining the fourth merge-bit symbol PDSV and ODD; and then performing an XOR logic operation on the previous channel-bit symbol ODD and the fourth merge-bit symbol ODD to thereby obtain a start-to-the-fourth-merge-bit ODD; and then determining the ZDSV value for the fourth merge-bit symbol based on the previous channel-bit symbol ZDSV and the fourth PDSV; and then, in the case of the starting logic voltage state of the NRZI signal being LOW, determining the result of the fourth ZDSV plus the start-to-next-channel-bit ODD to thereby obtain a fourth DSV corresponding to the fourth merge-bit symbol; and while in the case of the starting logic voltage state of the NRZI signal being HIGH, determining the result of the fourth ZDSV minus the start-to-next-channel-bit ODD to thereby obtain a fourth DSV corresponding to the fourth merge-bit symbol; and then checking whether the resulting bit stream from the fourth merge-bit symbol exceeds a specified run length; if YES, eliminating the fourth DSV; (8) finding which one of the non-eliminated DSV values has the minimum absolute value;(9) if the first DSV has the minimum absolute value, then assigning the current channel-bit symbol as the previous channel-bit symbol, the first ZDSV as the previous channel-bit symbol ZDSV, and the current start-to-channel-bit ODD as the previous channel-bit symbol ODD; then jumping to the step (3); (10) if the second DSV has the minimum absolute value, then assigning the current channel-bit symbol as the previous channel-bit symbol, the second ZDSV as the previous channel-bit symbol ZDSV, and the current start-to-channel-bit ODD as the previous channel-bit symbol ODD; then jumping to the step (3); (11) if the third DSV has the minimum absolute value, then assigning the current channel-bit symbol as the previous channel-bit symbol, the third ZDSV as the previous channel-bit symbol ZDSV, and the current start-to-channel-bit ODD as the previous channel-bit symbol ODD; then jumping to the step (3); and (12) if the fourth DSV has the minimum absolute value, then assigning the current channel-bit symbol as the previous channel-bit symbol, the fourth ZDSV as the previous channel-bit symbol ZDSV, and the current start-to-channel-bit ODD as the previous channel-bit symbol ODD; then jumping to the step (3).

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

In the following detailed description of the invention, the algorithm utilized by the invention will be first introduced, following the implementation of the algorithm.

Algorithm Utilized by the Invention

The invention utilizes a new concept called Zero Digital Sum Variation (ZDSV). Based on the ZDSV principle, each 0 in the NRZI signal is regarded as a "−1" if the 0 is at the LOW state and as a "+1" if the 0 is at the HIGH state.

Figure 1:
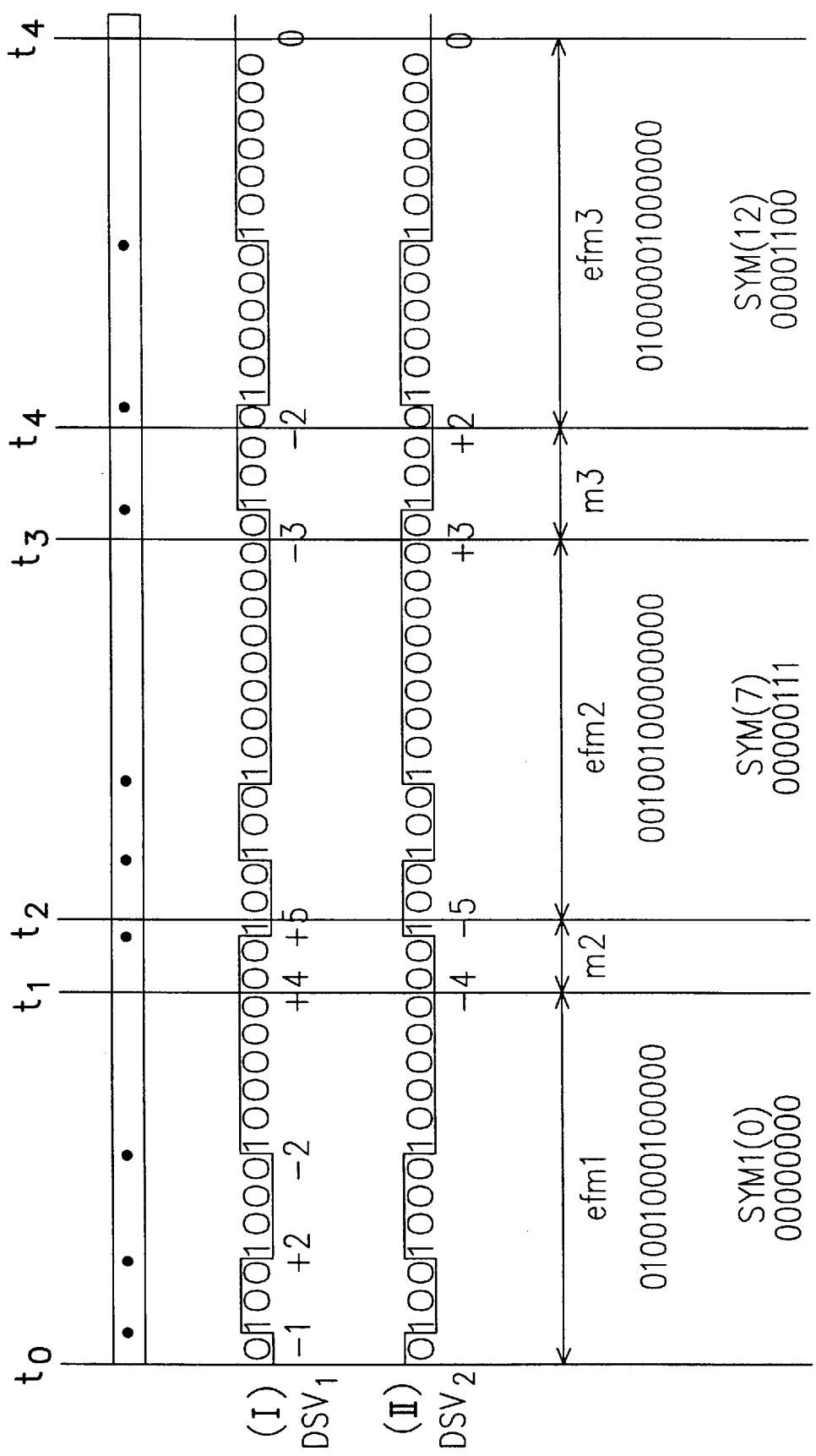
FIG. 1 (PRIOR ART) is a schematic diagram used to depict the generation of an NRZI signal and a bit stream from a pattern of pits on a CD.
Figure 2:
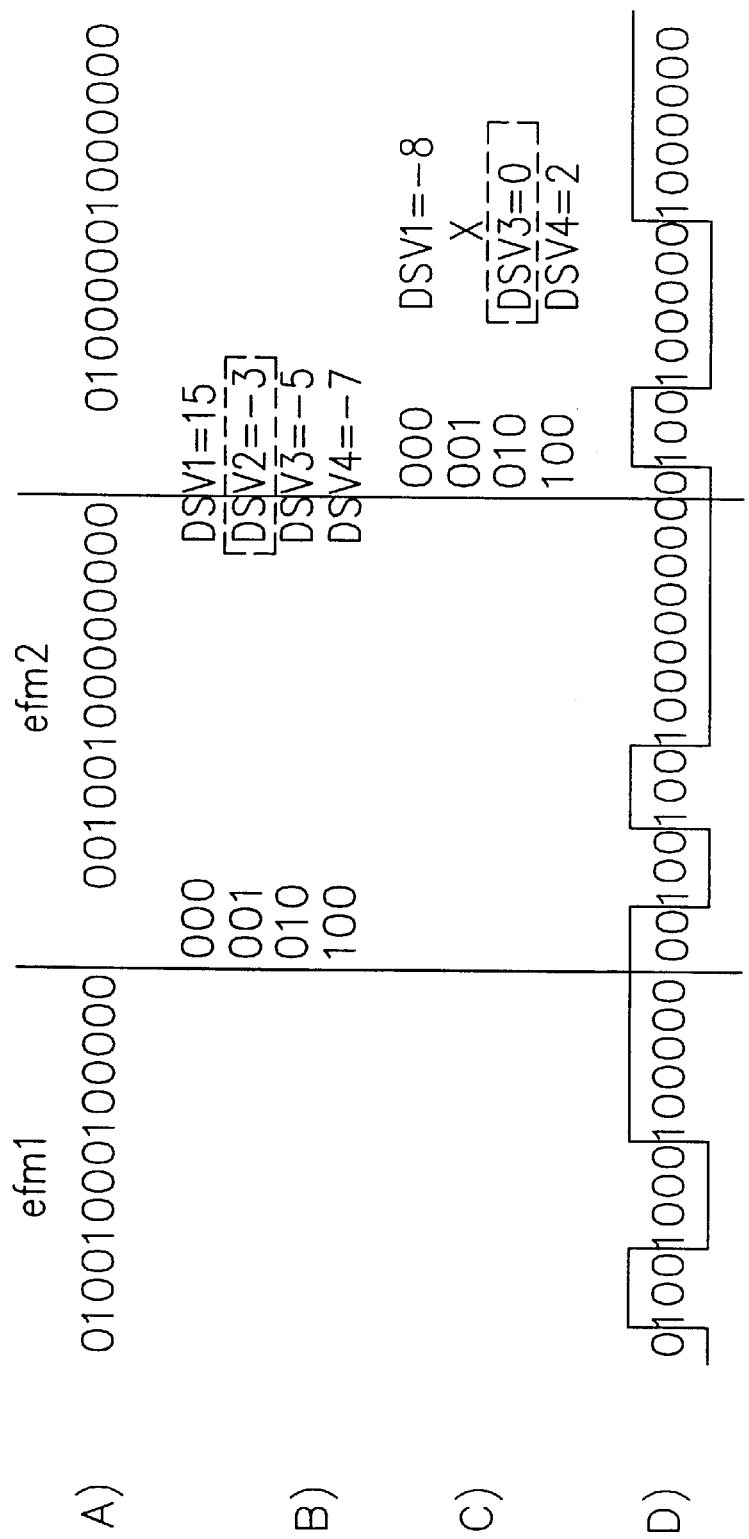
FIG. 2 (PRIOR ART) is a schematic diagram used to depict how a conventional method is used to obtain the optimal merge-bit symbol for insertion between each succeeding pair of channel-bit symbols.
Figure 3A:
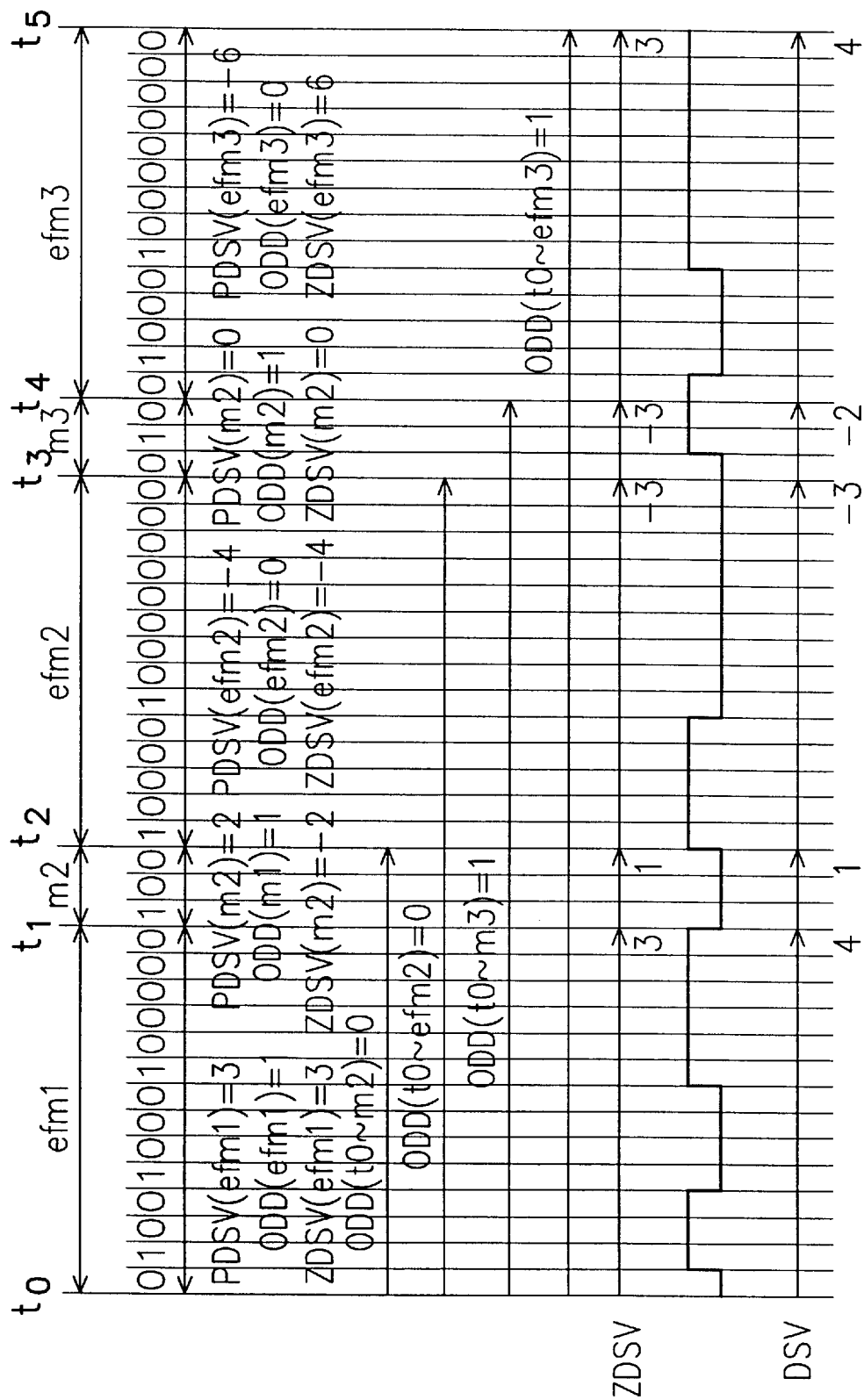
FIG. 3a shows a comparison between DSV and ZDSV in the case of the starting logic voltage state being LOW and the total of 1s being an odd number.

FIG. 3A shows a comparison between DSV and ZDSV when the starting logic voltage state of the NRZI signal is LOW and the total number of 1s is an odd number. As shown, at the start, the ZDSV value is 0; subsequently at the appearance of the first 0, since this 0 is at the LOW state, the ZDSV value becomes −1; subsequently, since the next three bits 100 are at the HIGH state and include two 0s, the ZDSV value becomes $-1+2=+1$; subsequently, since the next four bits 1000 are at the LOW state and include three 0s, the ZDSV value becomes $-1+2-3=-2$; and subsequently, the next six bits 100000 are at the HIGH state and include five 0s, the ZDSV value becomes $-1+2-3+5=+3$ at $t_1$. (i.e., at the end of $efm_1$).

Subsequently, at $t_2$, the ZDSV value becomes +1 for the bit stream ($efm_1$, $m_2$); at $t_3$, the ZDSV value becomes −3 for the bit stream ($efm_1$, $m_2$, $efm_2$); at $t_4$, the ZDSV value becomes −3 for the bit stream ($efm_1$, m2, $efm_2$, $m_3$); and at $t_5$, the ZDSV value becomes 3 for the bit stream ($efm_1$, $m_2$, $efm_2$, $m_3$, $efm_3$).

By contrast, based on the conventional DSV method, the DSV value varies in such a manner that, at $t_2$, the DSV value is +4; at $t_3$, the DSV value becomes −3; at $t_4$, the DSV value becomes −2; and at $t_5$, the DSV value becomes +4.

Figure 3B:
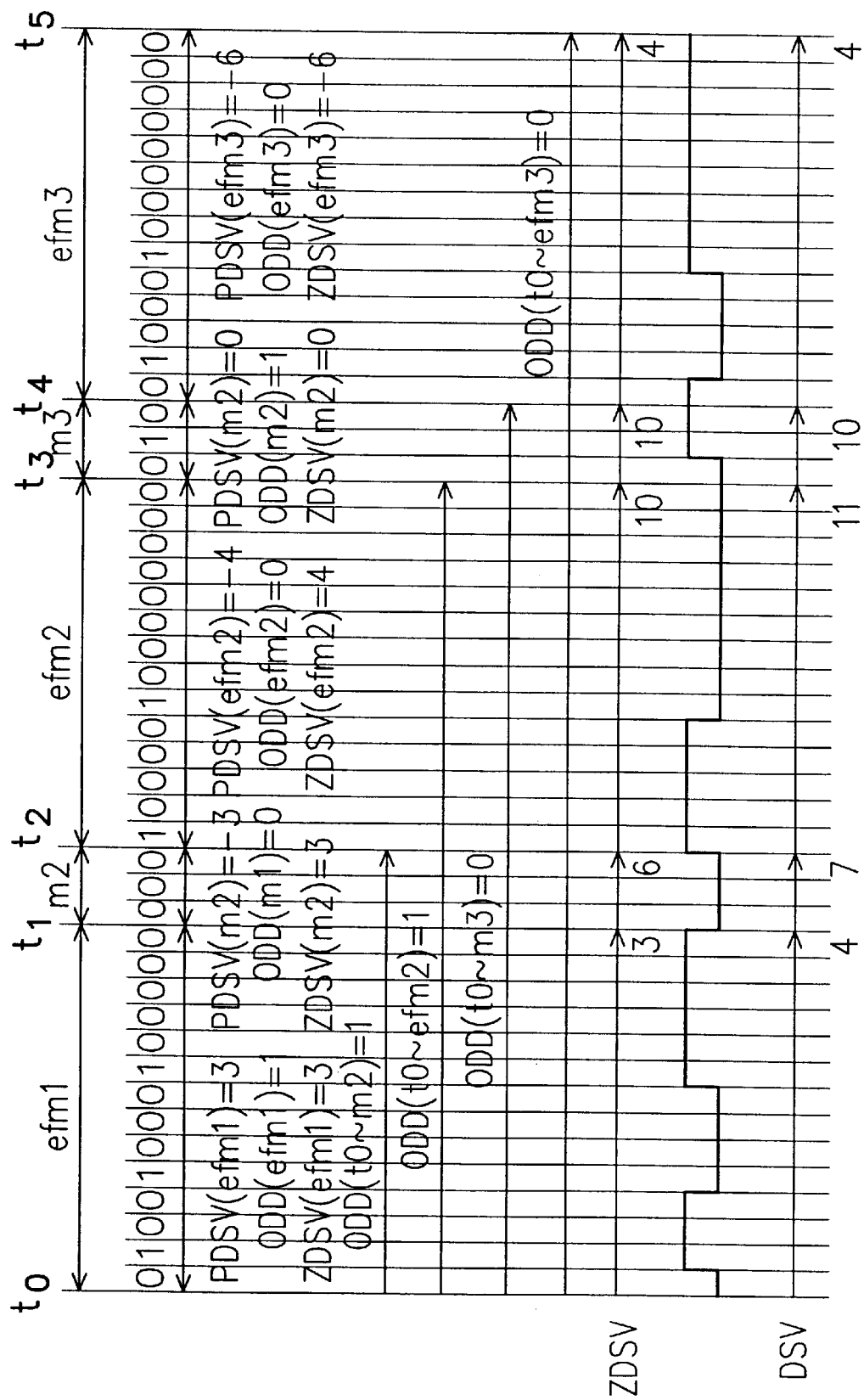
FIG. 3b shows a comparison between DSV and ZDSV in the case of the starting logic voltage state being LOW and the total of 1s being an even number.

FIG. 3B shows a comparison between DSV and ZDSV when the starting logic voltage state is LOW and the total number of 1s is an even number.

As shown, at $t_1$, the ZDSV value is +3; at $t_2$, the ZDSV value becomes +6; at $t_3$, the ZDSV value becomes +10; at $t_4$, the ZDSV value is still +10; and at $t_5$, the ZDSV value becomes +4.

By contrast, based on the conventional DSV method, the DSV value varies in such a manner that, at $t_1$, the DSV value is +4; at $t_2$, the DSV value becomes +7; at $t_3$, the DSV value becomes +11; at $t_4$, the DSV value becomes +10; and at $t_5$, the DSV value becomes +4.

From the foregoing examples of FIGS. 3A and 3B, it can be learned that when the total number of 1s is an odd number, the NRZI signal varies in voltage state for an odd-number of times, and the difference between the ZDSV value and the DSV value is 1 (i.e., DSV=ZDSV+1); whereas when the total number of 1s is an even number, the NRZI signal varies in voltage state for an even-number of times, and the difference between the ZDSV value and the DSV value is 0 (i.e., ZDSV=DSV).

In the forgoing case, the computation for ZDSV and the conversion of ZDSV into DSV are disclosed in the following. The algorithm involves the use of the following variables: $GZ_n$, ZDSV, PDSV(SEGMENT), ZDSV(SEGMENT), and ODD(SEGMENT), which are introduced in the following.

$GZ_n$

Assume that, in a bit stream, each series of consecutive 0s are collected as a group, with 1 serving as the separator between each neighboring pair of groups. Furthermore, assume that $GZ_n$ represents the total number of 0s in the (n)th group. In the example of FIG. 3A, starting at $t_0$, it can be easily seen that $GZ_1=1$, $GZ_2=2$, $GZ_3=3$, $GZ_4=5$, and so forth.

ZDSV

When the starting logic voltage state of the NRZI signal is LOW, it is apparent that the first 0 group is minus. It can be deduced that:

$$ZDSV = \sum_{x=1}^{n} GZ_x \cdot (-1)^x$$

In the example of FIG. 3A, at t5, a total of ten 0 groups are collected, and therefore, $$ZDSV = GZ_1 \cdot (-1) + GZ_2 \cdot (+1) + GZ_3 \cdot (-1) + GZ_4 \cdot (+1) +$$
$$GZ_5 \cdot (-1) + GZ_6 \cdot (+1) + GZ_7 \cdot (-1) + GZ_8 \cdot (+1) +$$
$$GZ_9 \cdot (-1) + GZ_{10} \cdot (+1)$$
$$= (-1) + (2) + (-3) + (5) + (-2) + (4) + (-9) + (2) + (-3) + (8)$$
$$= 3$$

PDSV(SEGMENT)

PDSV(SEGMENT) refers to Partial ZDSV, which represents the ZDSV value of a particular segment in the total bit stream, where the segment can be one of the 14-bit channel-bit symbols $efm_1$, $efm_2$, $efm_3$, or one of the 3-bit merge-bit symbols $m_2$, $m_3$ inserted among $efm_1$, $efm_2$, $efm_3$. By PDSV, the first group starts at the beginning of a channel-bit symbol or a merge-bit symbol. It can be formulated as follows:

$$PDSV = \sum_{x=1}^{n} GZ_x \cdot (-1)^x$$

Accordingly, in the example of FIG. 3A, $$PDSV(efm_1) = \sum_{x=1}^{4} GZ_x \cdot (-1)^x = (-1) + (2) + (-3) + (5) = 3$$

PDSV($m_2$)=2
PDSV($efm_2$)=(4)+(−8)=−4
PDSV($m_3$)=(−1)+(1)=0
PDSV($efm_3$)=(−1)+(3)+(−8)=−6

ZDSV(SEGMENT)

ZDSV(SEGMENT) is similar to PDSV except that the number of 0 groups is counted from the start of the bit stream. It is formulated as follows:

$$ZDSV = \sum_{x=m}^{p} GZ_x \cdot (-1)^x$$

where m represents the total number of 0 groups between the start of the bit stream and the start of the segment.

Accordingly, in the example of FIG. 3A, $$ZDSV(efm_1) = \sum_{x=1}^{4} GZ_x \cdot (-1)^x = (-1) + (2) + (-3) + (5) = 3$$

$$ZDSV(m_2) = \sum_{x=5}^{5} GZ_x \cdot (-1)^x = -2$$

$$ZDSV(efm_2) = \sum_{x=6}^{7} GZ_x \cdot (-1)^x = (4) + (-8) = -4$$

$$ZDSV(m_3) = \sum_{x=7}^{8} GZ_x \cdot (-1)^x = (-1) + (1) = 0$$

$$ZDSV(efm_3) = \sum_{x=8}^{10} GZ_x \cdot (-1)^x = (1) + (-3) + (8) = 6$$

ODD(SEGMENT)

ODD(SEGMENT) is used to indicate whether SEGMENT contains an odd-number or an even-number of 1s, where SEGMENT is a series of consecutive bits. Each consecutive bit can be a channel-bit symbol, a merge-bit symbol, or a segment of bits starting at $t_0$ and ending at a channel-bit symbol or a merge-bit symbol. If the number is odd, ODD(SEGMENT)=1; otherwise, if the number is even, ODD(SEGMENT)=0. In the example of FIG. 3A, ODD($efm_1$)=1; (three 1s)
ODD($m_2$)=1; (one 1)
ODD($efm_2$)=0; (two 1s)
ODD($m_3$)=1; (one 1)
ODD($efm_3$)=0; (two 1s)
ODD($t_0$~$efm_1$)=ODD($efm_1$)=1; (three 1s)
ODD($t_0$~$m_2$)=0; (four 1s)
ODD($t_0$~$efm_2$)=0; (six 1s)
ODD($t_0$~m3)=0; (seven 1s)
ODD($t_0$~$efm_2$)=1; (nine 1s)

For ODD($t_0$~m2), ODD($t_0$~$efm_2$), ODD($t_0$~$m_3$), ODD($t_0$~$efm_2$), they can be formulated as follows:

$$ODD(t_0 \sim m_2) = ODD(efm_1) \oplus ODD(m_2)$$
$$= 1 \oplus 1 \text{ (where } \oplus \text{ represents the } XOR \text{ logic operation)}$$
$$= 0$$

$$ODD(t_0 \sim efm_2) = ODD(t_0 \sim m_2) \oplus ODD(efm_2)$$
$$= 0 \oplus 0$$
$$= 0$$

$$ODD(t_0 \sim m_3) = ODD(t_0 \sim efm_2) \oplus ODD(m_3)$$
$$= 0 \oplus 1$$
$$= 1$$

-continued $$ODD(t_0 \sim efm_3) = ODD(t_0 \sim m_3) \oplus ODD(efm_3)$$
$$= 1 \oplus 0$$
$$= 1$$

Figure 4:
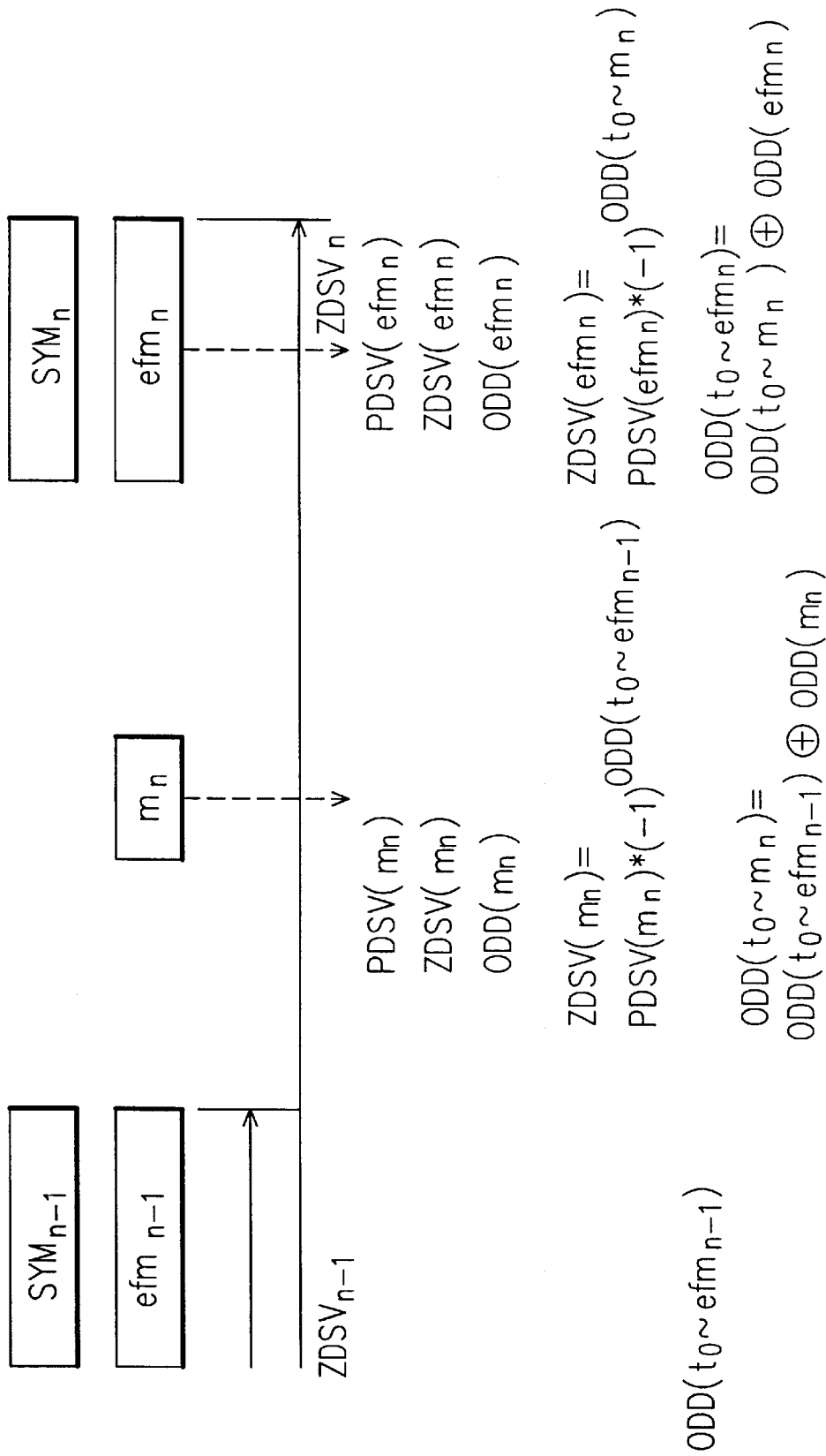
FIG. 4 is a schematic diagram used to depict the algorithm used to compute for ZDSV.

FIG. 4 is a schematic diagram used to depict the algorithm used to compute ZDSV. Assume that $SYM_n$ represents the original (n)th symbol. Through EFM, the (n−1)th channel-bit symbol $efm_{n-1}$, is obtained from the (n−1)th symbol $SYM_{n-1}$ and the (n)th channel-bit symbol $efm_n$ is obtained from the (n)th symbol $SYM_n$. Assume that $m_n$ is the merge-bit symbol inserted between $efm_{n-1}$ and $efm_n$.

The values of $ZDSV_{n-1}$, $ODD(t_0 \sim efm_{n-1})$, $PDSV(m_n)$, $ODD(m_n)$, $DSV(efm_n)$, and $ODD(efm_n)$ can be determined through the use of the above-mentioned equations. Further, it can be deduced that:

$$ZDSV(m_n) = PDSV(m_n) * (-1)^{ODD(t_0 \text{-} efm_{n-1})}$$

$$ODD(t_0 \sim m_n) = ODD(t_0 \sim efm_{n-1}) \oplus ODD(m_n)$$

$$ZDSV(efm_n) = PDSV(efm_n) * (-1)^{ODD(t_0 \text{-} m_n)}$$

$$ODD(t_0 \sim efm_n) = ODD(t_0 \sim m_n) \oplus ODD(efm_n)$$
$$= ODD(t_0 \sim efm_{n-1}) \oplus ODD(m_n) \oplus ODD(efm_n)$$

Accordingly, $ZDSV_n$ can be formulated as follows:

$$ZDSV_n = ZDSV_{n-1} + ZDSV(m_n) + ZDSV(efm_n)$$
$$= ZDSV_{n-1} + PDSV(m_n) * (-1)^{ODD(t_0 - efm_{n-1})} +$$
$$PDSV(efm_n) * (-1)^{ODD(t_0 - m_n)}$$

Therefore, $$DSV_n = ZDSV_n + ODD(t_0 \sim efm_n)$$

This equation shows that when ODD=1, i.e., the segment ($t_0 \sim efm_n$) contains an odd-number of 1s, DSV=ZDSV+1; and when ODD=0, i.e., the segment contains an even-number of 1s, DSV=ZDSV.

Figure 5:
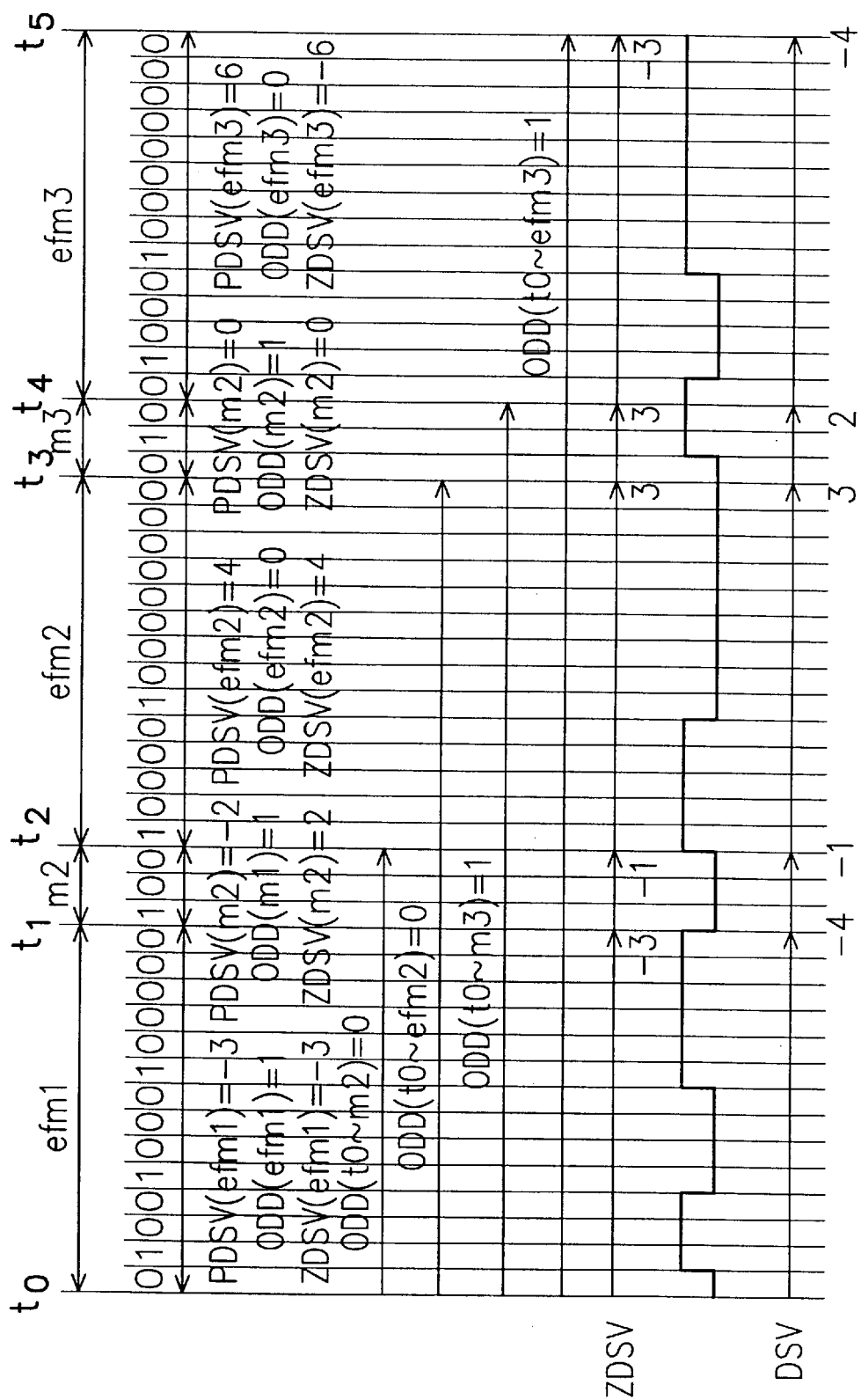
FIG. 5 is a schematic diagram used to show a comparison between DSV and ZDSV in the case of the starting logic voltage state of the NRZI signal being HIGH and the total of 1s being an odd number.

FIG. 5 is a schematic diagram used to show a comparison between DSV and ZDSV when the starting logic voltage state of the NRZI signal is HIGH and the total number of 1s is an odd number.

As shown, it can be seen that, at the start, the ZDSV value is 0. Subsequently, since the first 0 is at the HIGH state, the ZDSV value becomes +1; subsequently, since the next three bits 100 are at the LOW state and include two 0s, the ZDSV value becomes −1; subsequently, since the next four bits 1000 are at the HIGH state and include three 0s, the ZDSV value becomes +2; and subsequently, since the next six bits 100000 are at the LOW state, the ZDSV value becomes −3 at $t_1$.

Next, at the time point $t_2$, the ZDSV value becomes −1; subsequently at $t_3$, the ZDSV value becomes +3; subsequently at $t_4$, the ZDSV value becomes +3; and finally at $t_5$, the ZDSV value becomes −3.

By contrast, the DSV value varies in such a manner that, at $t_1$, the DSV value is −4; at $t_2$, the DSV value becomes −1; at $t_3$, the DSV value becomes +3; at $t_4$, the DSV value becomes +2; and at $t_5$, the DSV value becomes −4.

Therefore, it can be learned that, in foregoing case, the NRZI signal varies in voltage state for an odd-number of times, and the difference between the ZDSV value and the DSV value is 1, i.e., DSV=ZDSV −1; whereas when the total number of 1s is an even number, the NRZI signal varies in voltage state for an even-number of times, and the difference between the ZDSV value and the DSV value is 0, i.e., ZDSV=DSV.

In the forgoing case, the computation for ZDSV and the conversion of ZDSV into DSV are disclosed in the following. The algorithm involves the use of the following variables: $GZ_n$, ZDSV, PDSV(SEGMENT), ZDSV(SEGMENT), and ODD(SEGMENT), which are introduced in the following.

$GZ_n$

Assume that, in a bit stream, each series of consecutive 0s are collected as a group, with 1 serving as the separator between each neighboring pair of 0 groups. Furthermore, assume that $GZ_n$ represents the total number of 0s in the (n)th 0 group. In the example of FIG. 5, starting at $t_0$, it can be easily seen that $GZ_1=1$, $GZ_2=2$, $GZ_3=3$, $GZ_4=5$, and so forth.

ZDSV

In this case, ZDSV can be formulated as follows:

$$ZDSV = \sum_{x=1}^{n} GZ_x \cdot (-1)^{x+1}$$

Here, the power of (−1) is x+1 instead of x because the start of the NRZI signal is positive. Accordingly, in the example of FIG. 5, at $t_5$, the ZDSV value is as follows:

$$ZDSV = (1) + (-2) + (3) + (-5) + (2) + (-4) + (9) + (-2) + (3) + (-8)$$
$$= -3$$

PDSV(SEGMENT)

PDSV(SEGMENT) refers to Partial ZDSV of a particular segment in the bit stream, where the segment can be one of the 14-bit channel-bit symbol $efm_1$, $efm_2$, $efm_3$, or one of the 3-bit merge-bit symbols $m_2$, $m_3$. PDSV can be formulated as follows:

$$PDSV = \sum_{x=1}^{n} GZ_x \cdot (-1)^{x+1}$$

Accordingly, in the example of FIG. 5, $$PDSV(efm_1) = \sum_{x=1}^{4} GZ_x \cdot (-1)^{x+1} = (1) + (-2) + (3) + (-5) = -3$$

PDSV($m_2$)=−2
PDSV($efm_2$)=(−4)+(8)=4
PDSV($m_3$)=(1)+(−1)=0
PDSV($efm_3$)=(1)+(−3)+(8)=6

ZDSV(SEGMENT)

ZDSV(SEGMENT) is similar to PDSV except that the number of 0 groups is counted from the start of the bit stream. It is here formulated as follows:

$$ZDSV = \sum_{x=m}^{p} GZ_x \cdot (-1)^{x+1}$$

where m represents the total number of 0 groups between the start of the bit stream and the start of the segment.

Accordingly, in the example of FIG. 5, $$ZDSV(efm_1) = \sum_{x=1}^{4} GZ_x \cdot (-1)^{x+1} = (1) + (-2) + (3) + (-5) = -3$$

$$ZDSV(m_2) = \sum_{x=5}^{5} GZ_x \cdot (-1)^{x+1} = 2$$

$$ZDSV(efm_2) = \sum_{x=6}^{7} GZ_x \cdot (-1)^{x+1} = (-4) + (8) = 4$$

$$ZDSV(m_3) = \sum_{x=7}^{8} GZ_x \cdot (-1)^{x+1} = (1) + (-1) = 0$$

$$ZDSV(efm_3) = \sum_{x=8}^{10} GZ_x \cdot (-1)^{x+1} = (-1) + (3) + (-8) = -6$$

ODD(SEGMENT)

ODD(SEGMENT) is used to indicate whether SEGMENT contains an odd-number or an even-number of 1s. If the number is odd, ODD(SEGMENT)=1; otherwise, if the number is even, ODD(SEGMENT)=0.

Assume that $SYM_n$ represents the original (n)th symbol. Through EFM, the (n−1)th channel-bit symbol $efm_{n-1}$ is obtained from the (n−1)th symbol $SYM_{n-1}$, and the (n)th channel-bit symbol $efm_n$ is obtained from the (n)th symbol $SYM_n$. Assume that $m_n$ is the merge-bit symbol inserted between $efm_{n-1}$ and $efm_n$.

The values of $ZDSV_{n-1}$, $ODD(t_0 \sim efm_{n-1})$, $PDSV(m_n)$, $ODD(m_n)$, $DSV(efm_n)$, and $ODD(efm_n)$ can be determined through the use of the above-mentioned equations. Further, it can be deduced that:

$$ZDSV(m_n) = PDSV(m_n) * (-1)^{ODD(t_0 - efm_{n-1})}$$

$$ODD(t_0 \sim m_n) = ODD(t_0 \sim efm_{n-1}) \oplus ODD(m_n)$$

$$ZDSV(efm_n) = PDSV(efm_n) * (-1)^{ODD(t_0 - m_n)}$$

$$ODD(t_0 \sim efm_n) = ODD(t_0 \sim m_n) \oplus ODD(efm_n)$$

$$= ODD(t_0 \sim efm_{n-1}) \oplus ODD(m_n) \oplus ODD(efm_n)$$

Accordingly, $ZDSV_n$ can be formulated as follows:

$$ZDSV_n = ZDSV_{n-1} + ZDSV_{(m_n)} + ZDSV(efm_n)$$

$$= ZDSV_{n-1} + PDSV_{(m_n)} * (-1)^{ODD(t_0 - efm_{n-1})} + PDSV(efm_n) * (-1)^{ODD(t_0 - m_n)}$$

Therefore, $$DSV_n = ZDSV_n - ODD(t_0 \sim efm_n)$$

This equation shows that when ODD=1 (i.e., the segment contains an odd-number of 1s), DSV=ZDSV−1; and when ODD=0 (i.e., the segment contains an even-number of 1s), DSV=ZDSV.

Implementation of the Invention

Figure 6:
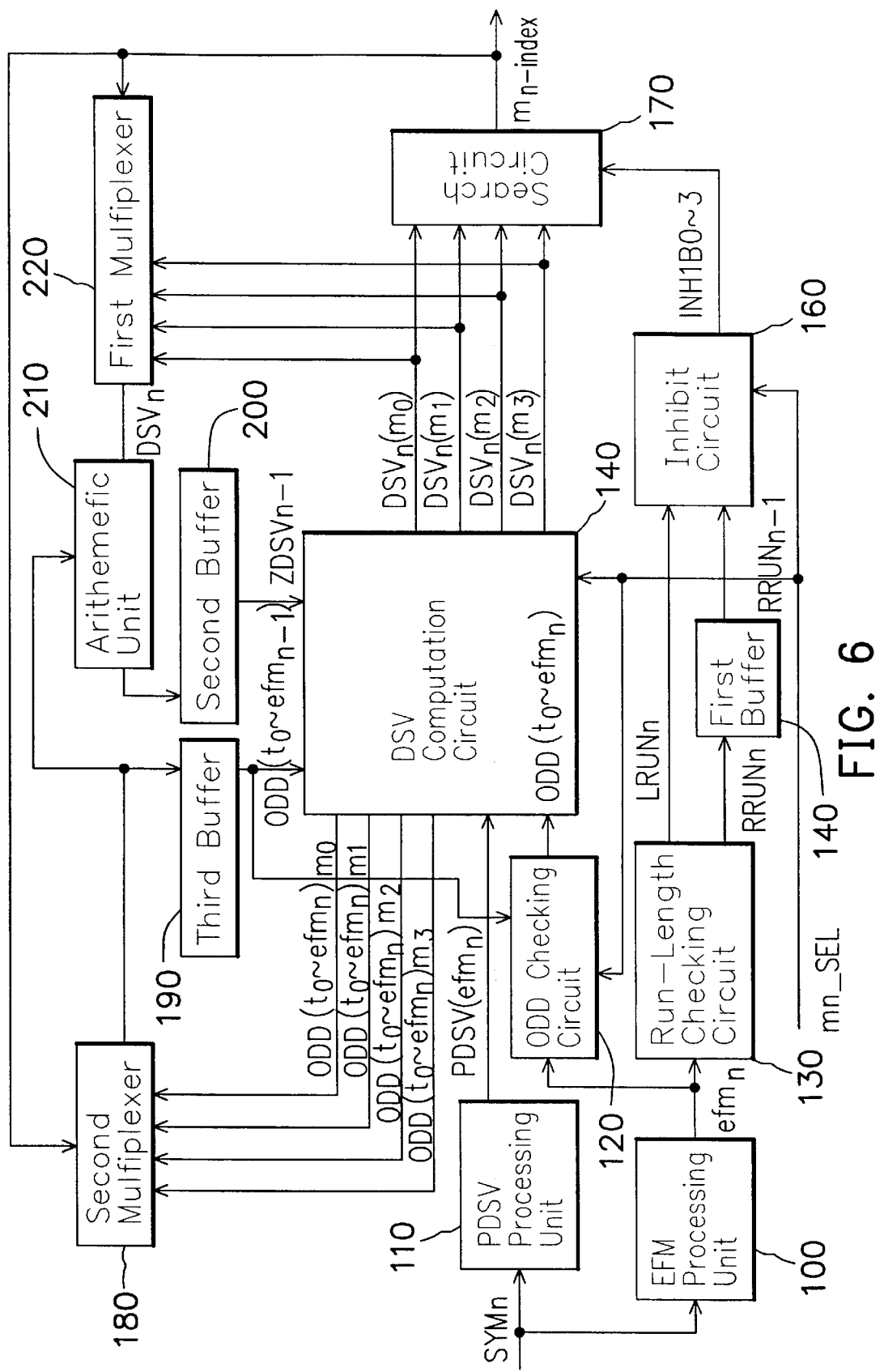
FIG. 6 is a schematic block diagram showing the system architecture of the DSV computation method and system according to the invention.

FIG. 6 is a schematic block diagram showing the system architecture of the DSV computation method and system according to the invention. As shown, the system architecture includes an EFM processing unit 100, a PDSV processing unit 110, an ODD checking circuit 120, a run-length checking circuit 130, a first buffer 150, a second buffer 200, a third buffer 190, an inhibit circuit 160, a search circuit 170, a first multiplexer 220, a second multiplexer 180, an arithmetic unit 210, and a DSV computation circuit 300. The EFM processing unit 100 and the PDSV processing unit 110 are two separate memory units which are used to implement a lookup table that allows each input 8-bit symbol $SYM_n$ to find its corresponding channel-bit symbol $efm_n$ and PDSV ($efm_n$).

The $efm_n$ data is outputted from the EFM processing unit 100 and then transferred to both the ODD checking circuit 120 and the run-length checking circuit 130, while the PDSV($efm_n$) data is outputted from the PDSV processing unit 110 and then transferred to the DSV computation circuit 300. The merge-bit selection signal $m_n\_SEL$ varies state sequentially in such a manner as to represent the selection of one of the four merge-bit symbols $m_0$=(000), $m_1$=(001), $m_2$=(010), and $m_3$=(100). These four merge-bit symbols are then inserted one by one between $efm_n$ and $efm_{n-1}$ to compute the corresponding $DSV_n$ values, which are respectively denoted by $DSV_n(m_0)$, $DSV_n(m_1)$, $DSV_n(m_2)$, and $DSV_n(m_3)$.

The run-length checking circuit 130 is used to check whether the current channel-bit symbol $efm_n$, after one merge-bit symbol has been inserted, will be compliant with the specified run length. To do this, the run-length checking circuit 130 first checks the 0 groups of the 14 bits of $emf_n$ and thereby assigns the first 0 group $GZ_1$ as $LRUN_n$ and the last 0 group $GZ_{LAST}$ as $RRUN_n$. In the example of $emf_n$=(01001000100000), $GZ_1$=1 so that $LRUN_n$=1, and $GZ_{LAST}$=5 so that $RRUN_n$=5. The first buffer 150 is used for temporary storage of the $RRUN_n$ value of the previous channel-bit symbol $efm_{n-1}$. The run-length checking circuit 130 then sends the $RRUN_n$ value to the first buffer 150 to replace the $RRUN_{n-1}$ value previously stored therein, and meanwhile sends the $LRUN_n$ value to the inhibit circuit 160.

Under control of the $m_n\_SEL$ signal, the inhibit circuit 160 first reads the $LRUN_n$ value and the $RRUN_{n-1}$ value, respectively, from the run-length checking circuit 130 and the first buffer 150, then successively inserts each of the four merge-bit symbols $m_0$=(000), $m_1$=(001), $m_2$=(010), and $m_3$=(100) between the $RRUN_{n-1}$ and the $LRUN_n$ value, and then checks whether the combined bit stream is compliant with the run length or not. If not compliant, the corresponding merge-bit symbol (hereinafter referred to as an invalid merge-bit symbol) will be sent via the INHIBIT0~3 data line to the search circuit 170, allowing the search circuit 170 to eliminate the $DSV_n$ corresponding to the invalid merge-bit symbol. For instance, if $m_1$ is an invalid merge-bit symbol, then $DSV_1(m_1)$ is eliminated.

The DSV computation circuit 300 is designed to compute $DSV_n(m_0)$, $DSV_n(m_1)$, $DSV_n(m_2)$, and $DSV_n(m_3)$ in accordance with the above-mentioned equations.

The ODD checking circuit 120 is used to perform the following steps: a first step of receiving $efm_n$ from the EFM processing unit 100 and $ODD(t_0 \sim efm_{n-1})$ from the third buffer 190; a second step of determining $ODD(efm_n)$; a third step of determining $ODD(m_n)$ under control of the $m_n\_SEL$ signal; and a final step of determining $ODD(t_0 \sim efm_n)=ODD(t_0 \sim efm_{n-1}) \oplus ODD(m_n) \oplus ODD(efm_n)$ for $m_0$, $m_1$, $m_2$, and $m_3$, respectively. The resulting four pieces of data are then transferred to the DSV computation circuit 300 for further processing.

The DSV computation circuit 300 receives the PDSV (efm$_n$) data from the PDSV processing unit 110, the ODD (t$_0$~efm$_n$) data from the ODD checking circuit 120, the ODD(t$_0$~efm$_{n-1}$) data from the third buffer 190, and the ZDSV$_{n-1}$ data from the second buffer 200, and then computes for DSV$_n$(m$_0$) at the appearance of the m$_n$_SEL signal for m$_0$ in accordance with the following equations:

$$ZDSV_n = ZDSV_{n-1} + ZDSV_{(m_n)} + ZDSV(efm_n)$$

$$= ZDSV_{n-1} + PDSV_{(m_n)} * (-1)^{ODD(t_0 - efm_{n-1})} + PDSV(efm_n)^* (-1)^{ODD(t_0 - m_n)}$$

$$ODD(t_0\sim m_n) = ODD(t_0\sim efm_{n-1}) \oplus ODD(m_n)$$

$$DSV_n = ZDSV_n + ODD(t_0\sim efm_n)$$

The DSV$_n$ (m$_0$) data is then transferred both to the search circuit 170 and to the first multiplexer 220 and latched thereby. Meanwhile, the ODD(t$_0$~efm$_n$) data for m$_0$, denoted as ODD(t$_0$~efm$_n$)m$_0$, is transferred back to the second multiplexer 180.

In a similar manner, DSV$_n$(m$_1$), DSV$_n$(m$_2$), and DSV$_n$(m$_3$) can be determined, and are then transferred both to the search circuit 170 and to the first multiplexer 220. Meanwhile, ODD(t$_0$~efm$_n$)m$_1$, ODD(t$_0$~efm$_n$)m$_2$, and ODD(t$_0$~efm$_n$)m$_3$ are transferred to the second multiplexer 180 to be latched therein.

The search circuit 170, based on the information about the invalid merge-bit symbol from the INHIBIT0~3 data line, first eliminates any one of the DSV$_n$(m$_0$), DSV$_n$(m$_1$), DSV$_n$(m$_2$), DSV$_n$(m$_3$) corresponding to the invalid merge-bit symbol, and then, from the remaining ones, chooses the one whose value is closest to zero (i.e., the one whose absolute value is minimum). The corresponding merge-bit symbol of the chosen DSV$_n$, referred to as the optimal merge-bit symbol, is then indicated via the m$_n$_Index data line to the second multiplexer 180 and the first multiplexer 220. The m$_n$_Index signal causes the second multiplexer 180 to select the ODD(t$_0$~efm$_n$) corresponding to the optimal merge-bit symbol and then transfers the selected one to the third buffer 190 and the arithmetic unit 210. Meanwhile, the m$_n$_Index signal causes the first multiplexer 220 to select the DSV$_n$ corresponding to the optimal merge-bit symbol and then transfer the selected one to the arithmetic unit 210. At the arithmetic unit 210, the following arithmetic operation is performed to obtain ZDSV$_n$:

$$ZDSV_n = DSV_n - ODD(t_0\sim efm_n)$$

Note that in the foregoing case, the arithmetic unit 210 performs a summation operation, but when the starting logic voltage state of the NRZI signal is HIGH, the above arithmetic operation will be ZDSV$_n$=DSV$_n$+ODD(t$_0$~efm$_n$), and thus the arithmetic unit 210 performs a subtraction operation. The obtained ZDSV$_n$ is then transferred to the second buffer 200. Next, the current ZDSV$_n$ and ODD(t$_0$~efm$_n$) data stored respectively in the second buffer 200 and the third buffer 190 are fetched as ZDSV$_{n-1}$ and ODD(t$_0$~efm$_{n-1}$) for the next symbol SYM$_n$ to find its optimal merge-bit symbol.

Figure 7:
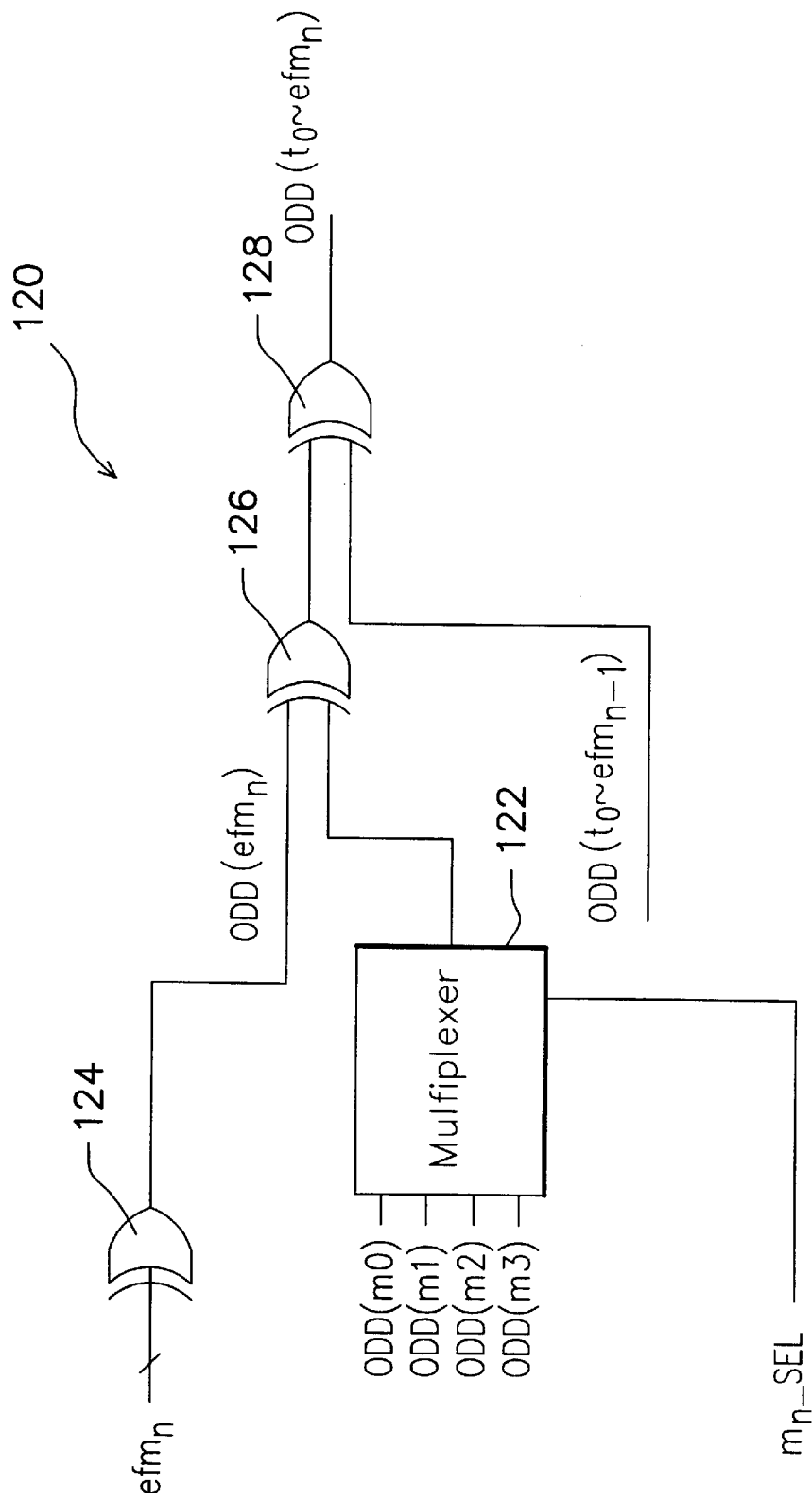
FIG. 7 is a schematic diagram showing the inside circuit architecture of the ODD checking circuit used in the DSV computation system of the invention shown in FIG. 6.

FIG. 7 is a schematic diagram showing the inside circuit architecture of the ODD checking circuit 120 used in the DSV computation system of the invention shown in FIG. 6. As shown, the ODD checking circuit 120 includes a multiplexer 122, a first XOR gate 124, a second XOR gate 126, and a third XOR gate 128. When the m$_n$_SEL signal represents m$_0$, it causes the multiplexer 122 to select ODD (m$_0$) as output. The first XOR gate 124 processes efm$_n$ to obtain ODD(efm$_n$). The second XOR gate 126 and the third XOR gate 128 in combination perform following the logic operation to obtain ODD(t$_0$~efm$_n$):

$$ODD(t_0\sim efm_n) = ODD(t_0\sim efm_{n-1}) \oplus ODD(m_n) \oplus ODD(efm_n)$$

Since the output ODD(t$_0$~efm$_n$) corresponds to m$_0$, it is denoted as ODD(t$_0$~efm$_n$)m$_0$.

In a similar manner, when the m$_n$_SEL signal successively represents m$_1$, m$_2$, and m$_3$, the outputs ODD(t$_0$~efm$_n$) m$_1$, ODD(t$_0$~efm$_n$)m$_2$, and ODD(t$_0$~efm$_n$)m$_3$ will be successively obtained.

Figure 8:
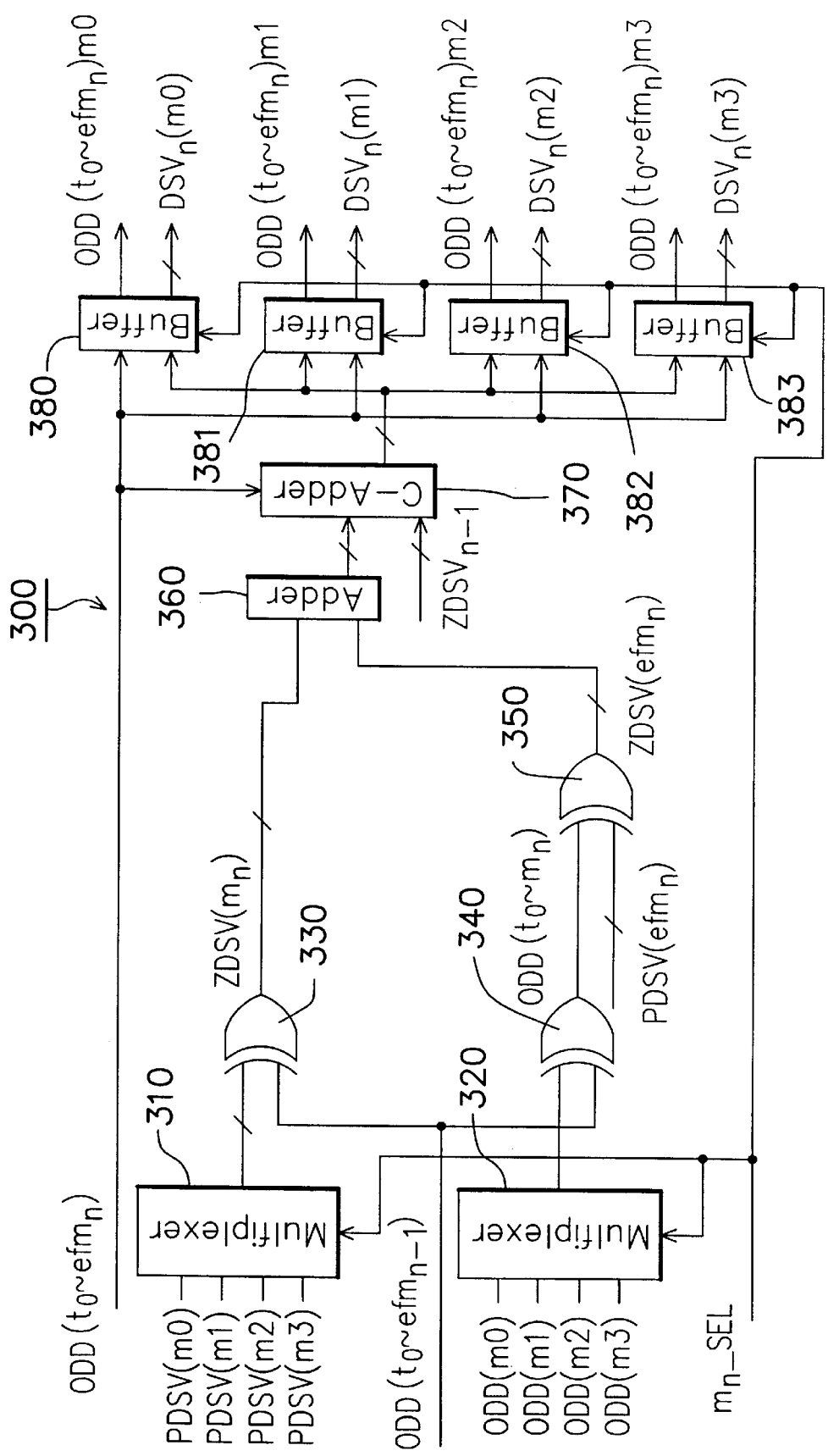
FIG. 8 is a schematic diagram showing the inside architecture of the DSV computation circuit used in the DSV computation system of the invention shown in FIG. 6.

FIG. 8 is a schematic diagram showing the inside circuit architecture of the DSV computation circuit 300 used in the DSV computation system of the invention shown in FIG. 6. As shown, the DSV computation circuit 300 includes a first multiplexer 310, a second multiplexer 320, a first XOR gate 330, a second XOR gate 340, a third XOR gate 350, an adder 360, a C-adder (add with carry) 370, a first buffer 380, a second buffer 381, a third buffer 382, and a fourth buffer 383. When the m$_n$_SEL signal represents m$_0$, it causes the first multiplexer 310 to select PDSV(m$_0$) as output and meanwhile causes the second multiplexer 320 to select ODD(m$_0$) as output. The first XOR gate 330 then performs the logic operation PDSV(m$_0$) ⊕ ODD(t$_0$~efm$_{n-1}$) to obtain the output ZDSV(m$_n$). Meanwhile, the second XOR gate 340 performs the logic operation ODD (m$_0$) ⊕ ODD (t$_0$~efm$_{n-1}$) to obtain the output ODD(t$_0$~m$_n$). Subsequently, the third XOR gate 350 performs the logic operation ODD (t$_0$~m$_n$) ⊕ PDSV(efm$_n$) to obtain the output ZDSV(efm$_n$). After this, the adder 360 performs the arithmetic operation ZDSV(m$_n$)+ZDSV(efm$_n$), and subsequently, the second buffer 381 adds ZDSV$_{n-1}$ to the output of the adder 360 with ODD(t$_0$~efm$_n$) from the ODD checking circuit 120 (FIG. 6) being used as carry bit. The output of the C-adder 370 serves as the desired DSV$_n$(m$_0$), which is then transferred to the first buffer 380. The ODD(t$_0$~efm$_n$)m$_0$ data is stored together with the DSV$_n$(m$_0$) data in the first buffer 380.

Subsequently, the m$_n$_SEL signal changes states to represent m$_1$, m$_2$, and m$_3$ in a sequential manner to cause the DSV computation circuit 300 to successively produce DSV$_n$ (m$_1$), DSV$_n$(m$_2$), and DSV$_n$(m$_3$). The DSV$_n$(m$_1$) and ODD (t$_0$~efm$_n$)m$_1$ data are stored together in the second buffer 381; the DSV$_n$(m$_2$) and ODD(t$_0$~efm$_n$)m$_2$ data are stored together in the third buffer 382; and the DSV$_n$(m$_3$) and ODD(t$_0$~efm$_n$)m$_3$ data are stored together in the fourth buffer 383.

The invention is also applicable for use with a DVD system in which digitized video data are also represented by 8-bit symbols and converted through EFM into 14-bit channel-bit symbols. The difference is that in the DVD system, the EFM produces a number of 14-bit channel-bit symbols corresponding to each original 8-bit symbol. For this reason, there is no need to find the optimal merge-bit symbol and it is only required to find any one of the channel-bit symbols that is compliant with the run length.

Figure 9:
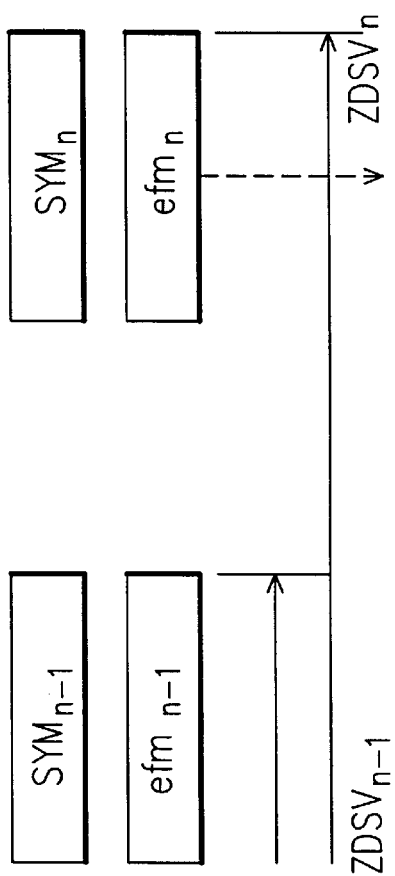
FIG. 9 is a schematic diagram used to depict how to compute for ZDSV in a DVD system.

FIG. 9 is a schematic diagram used to depict how to compute for ZDSV in a DVD system. In this case, assume that one channel-bit symbol efm$_{n-1}$ is obtained by processing the (n-1)th symbol SYM$_{n-1}$ through EFM, and a number of channel-bit symbols efm$_{n\_i}$ are obtained by processing the (n)th symbol SYM$_n$ through EFM.

In this case, the values of $ZDSV_{n-1}$, $ODD(t_0\sim efm_{n-1})$, $PDSV(efm_{n\_i})$, and $ODD(efm_{n\_i})$ for $efm_{n\_i}$ can be determined through the use of the above-mentioned equations. It can be deduced that:

$$ZDSV(efm_{n\_i}) = PDSV(efm_{n\_i}) * (-1)^{ODD(t_0\sim efm_{n-1})}$$

$$ODD(t_0\sim efm_{n\_i}) = ODD(t_0\sim efm_{n-1}) \oplus ODD(efm_{n\_i})$$

Accordingly, $ZDSV_{n-1}$ can be formulated as follows:

$$ZDSV_{n\_i} = ZDSV_{n-1} + ZDSV(efm_{n\_i})$$

$$= ZDSV_{n-1} + PDSV(efm_{n\_i})*(-1)^{ODD(t_0-efm_{n-1})}$$

Therefore, $$DSV_{n\_i} = ZDSV_{n-1} + ODD(t_0\sim efm_{n\_i})$$

Next, all the $efm_{n\_i}$ corresponding to $SYM_n$ are plugged into the above equation to obtain a number of $DSV_{n\_i}$ values, and from which the $efm_{n\_i}$ corresponding to the $DSV_{n\_i}$ having the minimum absolute value is chosen as the optimal channel-bit symbol for $SYM_n$.

In conclusion, the invention provides a DSV computation method and system which is capable of determining the DSV value of a bit stream to find the optimal merge-bit symbol for insertion between each succeeding pair of channel-bit symbols. Compared to the prior art, the invention can find the optimal merge-bit symbol based on DSV in a more cost-effective manner with a reduced amount of memory and utilizes a lookup table requiring a reduced amount of memory space for storage so that memory space can be reduced as compared to the prior art. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for computing a ZDSV of a stream of channel-bit symbols, comprising the steps of:
   (1) fetching the current channel-bit symbol, and then, based on a starting logic voltage state of an NRZI signal, determining a PDSV and an ODD of a current channel-bit symbol;
   (2) assigning the current channel-bit symbol PDSV as a previous start-to-channel-bit symbol ZDSV, and assigning the current channel-bit symbol ODD as a previous start-to-channel-bit symbol ODD;
   (3) selecting one of a plurality of merge-bit symbols, and then, based on the starting logic voltage state of the NRZI signal, determining a PDSV and an ODD of the selected merge-bit symbol;
   (4) based on the previous start-to-channel-bit symbol ODD and the current merge-bit symbol ODD, determining a current start-to-merge-bit ODD and a current start-to-merge-bit ZDSV;
   (5) fetching a next channel-bit symbol as the current channel-bit symbol, and then, based on the starting logic voltage state of the NRZI signal, determining a PDSV and an ODD of this channel-bit symbol;
   (6) performing an XOR operation on current start-to-merge-bit ODD and the current symbol ODD to thereby obtain the current start-to-channel-bit ODD, and also determining the current start-to-channel-bit ZDSV based on the current start-to-merge-bit ZDSV and the channel-bit symbol PDSV; and
   (7) assigning the current start-to-channel-bit ZDSV as the previous start-to-channel-bit symbol ZDSV, assigning the current start-to-channel-bit ODD as the previous start-to-channel-bit symbol ODD, and then jumping to step (3) for a next merge-bit symbol.

2. The method of claim 1, wherein when the starting logic voltage state of the NRZI signal is LOW, the PDSV of each channel-bit symbol is determined by an equation $$PDSV = \sum_{x=1}^{n} GZ_x \cdot (-1)^x$$

where $GZ_x$ is a total number of 0s in an (x)th 0 group in the channel-bit symbol and n is a total number of 0 groups in the channel-bit symbol.

3. The method of claim 1, wherein when the starting logic voltage state of the NRZI signal is HIGH, the PDSV of each channel-bit symbol is determined by an equation $$PDSV = \sum_{x=1}^{n} GZ_x \cdot (-1)^{x+1}$$

where $GZ_x$ is a total number of 0s in an (x)th 0 group in the channel-bit symbol and n is a total number of 0 groups in the channel-bit symbol.

4. The method of claim 1, wherein when the starting logic voltage state of the NRZI signal is LOW, the PDSV of each merge-bit symbol is determined by an equation $$PDSV = \sum_{x=1}^{n} GZ_x \cdot (-1)^x$$

where $GZ_x$ is a total number of 0s in an (x)th 0 group in the merge-bit symbol and n is a total number of 0 groups in the merge-bit symbol.

5. The method of claim 1, wherein when the starting logic voltage state of the NRZI signal is HIGH, the PDSV of each merge-bit symbol is determined by an equation $$PDSV = \sum_{x=1}^{n} GZ_x \cdot (-1)^{x+1}$$

where $GZ_x$ is a total number of 0s in an (x)th 0 group in the merge-bit symbol and n is a total number of 0 groups in the merge-bit symbol.

6. A method for computing the DSV of a bit stream of channel-bit symbols, comprising the steps of:
   (1) fetching the current channel-bit symbol and then, based on the starting logic voltage state of an NRZI signal, determining a PDSV and an ODD of the current channel-bit symbol;
   (2) assigning the current channel-bit symbol PDSV as a previous start-to-channel-bit symbol ZDSV, and assigning the current channel-bit symbol ODD as a previous start-to-channel-bit symbol ODD;
   (3) fetching the next channel-bit symbol and then, based on the starting logic voltage state of the NRZI signal, determining a PDSV and an ODD of this channel-bit symbol;

(4) from four merge-bit symbols including a first merge-bit symbol, a second merge-bit symbol, a third merge-bit symbol, and a fourth merge-bit symbol, selecting the first merge-bit symbol determining the first merge-bit symbol PDSV and ODD, performing an XOR logic operation on the previous start-to-channel-bit symbol ODD and the first merge-bit symbol ODD to thereby obtain a start-to-the-first-merge-bit ODD, determining the ZDSV value for the first merge-bit symbol based on the previous start-to-channel-bit symbol ZDSV and the first PDSV and then, when the starting logic voltage state of the NRZI signal is LOW, determining a result of the first ZDSV plus the start-to-next-channel-bit ODD to thereby obtain a first DSV corresponding to the first merge-bit symbol, when the starting logic voltage state of the NRZI signal is HIGH, determining the result of the first ZDSV minus the start-to-next-channel-bit ODD to thereby obtain a first DSV corresponding to the first merge-bit symbol, then checking whether the resulting bit stream from the first merge-bit symbol exceeds a specified run length, wherein if the specified run length is exceeded, the first DSV is eliminated;

(5) selecting the second merge-bit symbol, determining the second merge-bit symbol PDSV and ODD, performing an XOR logic operation on the previous channel-bit symbol ODD and the second merge-bit symbol ODD to thereby obtain a start-to-the-second-merge-bit ODD, determining the ZDSV value for the second merge-bit symbol based on the previous channel-bit symbol ZDSV and the second PDSV and then, when the starting logic voltage state of the NRZI signal is LOW, determining the result of the second ZDSV plus the start-to-next-channel-bit ODD to thereby obtain a second DSV corresponding to the second merge-bit symbol, when the starting logic voltage state of the NRZI signal is HIGH, determining the result of the second ZDSV minus the start-to-next-channel-bit ODD to thereby obtain a second DSV corresponding to the second merge-bit symbol and then checking whether the resulting bit stream from the second merge-bit symbol exceeds a specified run length, wherein if the specified run length is exceeded, the second DSV is eliminated;

(6) selecting the third merge-bit symbol; and then determining the third merge-bit symbol PDSV and ODD, performing an XOR logic operation on the previous channel-bit symbol ODD and the third merge-bit symbol ODD to thereby obtain a start-to-the-third-merge-bit ODD, determining the ZDSV value for the third merge-bit symbol based on the previous channel-bit symbol ZDSV and the third PDSV and then, when the starting logic voltage state of the NRZI signal is LOW, determining the result of the third ZDSV plus the start-to-next-channel-bit ODD to thereby obtain a third DSV corresponding to the third merge-bit symbol, when the starting logic voltage state of the NRZI signal is HIGH, determining the result of the third ZDSV minus the start-to-next-channel-bit ODD to thereby obtain a third DSV corresponding to the third merge-bit symbol, and then checking whether the resulting bit stream from the third merge-bit symbol exceeds a specified run length, wherein if the specified run length is exceeded, the third DSV is eliminated;

(7) selecting the fourth merge-bit symbol; and then determining the fourth merge-bit symbol PDSV and ODD, performing an XOR logic operation on the previous channel-bit symbol ODD and the fourth merge-bit symbol ODD to thereby obtain a start-to-the-fourth-merge-bit ODD, determining the ZDSV value for the fourth merge-bit symbol based on the previous channel-bit symbol ZDSV and the fourth PDSV and then, when the starting logic voltage state of the NRZI signal is LOW, determining the result of the fourth ZDSV plus the start-to-next-channel-bit ODD to thereby obtain a fourth DSV corresponding to the fourth merge-bit symbol, when the starting logic voltage state of the NRZI signal is HIGH, determining the result of the fourth ZDSV minus the start-to-next-channel-bit ODD to thereby obtain a fourth DSV corresponding to the fourth merge-bit symbol, and then checking whether the resulting bit stream from the fourth merge-bit symbol exceeds a specified run length, wherein if the specified run length is exceeded, the fourth DSV is eliminated;

(8) finding which one of the non-eliminated DSV values has a minimum absolute value;

(9) if the first DSV has the minimum absolute value, then assigning the current channel-bit symbol as the previous channel-bit symbol, the first ZDSV as the previous channel-bit symbol ZDSV, and the current start-to-channel-bit ODD as the previous channel-bit symbol ODD, and then jumping to the step (3);

(10) if the second DSV has the minimum absolute value, then assigning the current channel-bit symbol as the previous channel-bit symbol, the second ZDSV as the previous channel-bit symbol ZDSV, and the current start-to-channel-bit ODD as the previous channel-bit symbol ODD, and then jumping to the step (3);

(11) if the third DSV has the minimum absolute value, then assigning the current channel-bit symbol as the previous channel-bit symbol, the third ZDSV as the previous channel-bit symbol ZDSV, and the current start-to-channel-bit ODD as the previous channel-bit symbol ODD, and then jumping to the step (3); and

(12) if the fourth DSV has the minimum absolute value, then assigning the current channel-bit symbol as the previous channel-bit symbol, the fourth ZDSV as the previous channel-bit symbol ZDSV, and the current start-to-channel-bit ODD as the previous channel-bit symbol ODD, and then jumping to the step (3).

7. A method for use on a DVD system for computing the DSV of a stream of original binary symbols, the method comprising the steps of:

(1) converting the currently-received original binary symbol into its corresponding channel-bit symbol, and then, based on a starting logic voltage state of an NRZI signal, determining a PDSV and an ODD of a current channel-bit symbol;

(2) assigning the current channel-bit symbol PDSV as a ZDSV of a previous start-to-channel-bit symbol, and assigning the current channel-bit symbol ODD as a ODD of a previous start-to-channel-bit symbol;

(3) converting a subsequently-received original binary symbol into its corresponding multiple channel-bit symbols, and then, based on the starting logic voltage state of the NRZI signal, determining a PDSV and an ODD of these channel-bit symbols;

(4) determining a start-to-channel-bit ODD for each of these channel-bit symbols by performing an XOR logic operation on the previous channel-bit symbol ODD and each of the current channel-bit symbol ODD, determining the ZDSV of each of these channel-bit symbols based on the previous start-to-channel-bit symbol ZDSV and each current channel-bit symbol PDSV and then, when the starting logic voltage state of the NRZI signal is LOW, determining the result of the start-to-channel-bit ZDSV plus the start-to-channel-bit ODD to thereby obtain the start-to-channel-bit DSV, when the starting logic voltage state of the NRZI signal is HIGH, determining the result of the start-to-channel-bit ZDSV minus the start-to-merge-bit ODD to thereby obtain the start-to-channel-bit DSV, appending each of the current channel-bit symbols to the end of the previous channel-bit symbol, and then checking whether the resulting bit stream exceeds a specified run length, wherein if the specified run length is exceeded, the associated channel-bit symbol is eliminated;

(5) finding a one of the DSV values having a minimum absolute value; and (6) selecting the channel-bit symbol corresponding to the DSV value having the minimum absolute value as an optimal channel-bit symbol then assigning the start-to-channel-bit ZDSV as the previous start-to-channel-bit symbol ZDSV and assigning the start-to-channel-bit ODD as the previous start-to-channel-bit symbol ODD, and then jumping to step (3) for a next channel-bit symbol.

8. A method for computing a zero digital sum variation (ZDSV) of a stream of channel-bit symbols, comprising the steps of:

(a) providing an initial value $ZDSV_{n-1}$ and an initial value $ODD(t_0 \sim efm_{n-1})$, wherein the initial value $ZDSV_{n-1}$ is the zero digital sum variation of a previous start-to-channel-bit symbol $efm_{n-1}$, wherein the $ODD(t_0 \sim efm_{n-1})$ indicates that the stream of the channel-bit symbols from a starting logic voltage state to the previous start-to-channel-bit symbol $efm_{n-1}$ contains an odd-number or an even-number of 1s;

(b) providing a current channel-bit symbol $efm_n$, and obtaining a partial digital sum variation (PDSV) value $PDSV(efm_n)$ and a $ODD(efm_n)$ value in accordance with the current symbol $efm_n$;

(c) obtaining a plurality of partial digital sum variation (PDSV) values $PDSV(m_n^i)$ and $ODD(m_n^i)$ values in accordance with all possible merge-bit symbols $m_n^i$, wherein i=0, 1, . . . , x, the number of the possible merge-bit symbols is x+1;

(d) calculating $ZDSV_n^i = ZDSV_{n-1} + ZDSV(m_n^i) + ZDSV(efm_n)_i$ and calculating and $ODD(t_0 \sim efm_n)_i = ODD(t_0 \sim efm_{n-1}) \oplus ODD(m_n^i) \oplus ODD(efm_n)$, wherein i=0, 1, . . . , x, in order to determine the $ZDSV_n$ of the zero digital sum variation of the current channel-bit symbol $efm_n$, wherein $ZDSV(m_n^i) = PDSV(m_n^i) * (-1)^{ODD(t_0 \sim efm_{n-1})}$ and $ZDSV(efm_n)_i = PDSV(efm_n) * (-1)^{ODD(t_0 \sim m_n i)}$, wherein $ODD(t_0 \sim m_n^i) = ODD(t_0 \sim efm_{n-1}) \oplus ODD(m_n^i)$, wherein $\oplus$ represents the XOR logic operation, the $ZDSV_n^i$ is the zero digital sum variation of the channel-bit symbol $efm_n$ corresponding to the i-th merge-bit symbol of the possible merge-bit symbols, the $ZDSV(m_n^i)$ means a zero digital sum variation of the i-th merge-bit symbol of the possible merge-bit symbols corresponding to the current channel-bit symbol $efm_n$, the $ZDSV(efm_n)_i$ means a zero digital sum variation of the current channel-bit symbol $efm_n$ corresponding to the i-th merge-bit symbol of the possible merge-bit symbols;

(e) determining a final merge-bit symbol $m_n^j$ in accordance with the absolute value of $ZDSV_n^i$ and a run time limit, wherein $j \in \{i\}$, wherein i=0,1, . . . , x; and (f) assigning the initial value $ZDSV_{n-1} = ZDSV_n^j$, the $ODD(t_0 \sim efm_{n-1}) = ODD(t_0 \sim efm_n)_j$, and then jumping to step (b).

9. A method for computing a zero digital sum variation (ZDSV) of a stream of channel-bit symbols, comprising the steps of:

(a) providing an initial value $ZDSV_{n-1}$, an initial value $ODD(t_0 \sim efm_{n-1})$ and a initial bias value, wherein the initial value $ZDSV_{n-1}$ is the zero digital sum variation of a previous start-to-channel-bit symbol $efm_{n-1}$, wherein the $ODD(t_0 \sim efm_{n-1})$ indicates that the stream of the channel-bit symbols from a starting logic voltage state to the previous start-to-channel-bit symbol $efm_{n-1}$ contains an odd-number or an even-number of 1s, the initial bias value is either 1 or −1;

(b) providing a current channel-bit symbol $efm_n$, and obtaining a partial digital sum variation (PDSV) value $PDSV(efm_n)$ and a $ODD(efm_n)$ value in accordance with the current symbol $efm_n$;

(c) obtaining a plurality of partial digital sum variation (PDSV) values $PDSV(m_n^i)$ and $ODD(m_n^i)$ values in accordance with all possible merge-bit symbols $m_n^i$, wherein i=0, 1, . . . , x, the number of the possible merge-bit symbols is x+1;

(d) calculating $ZDSV_n^i = ZDSV_{n-1} + ZDSV(m_n^i) + ZDSV(efm_n)_i$ and calculating and $ODD(t_0 \sim efm_n)_i = ODD(t_0 \sim efm_{n-1}) \oplus ODD(m_n^i) \oplus ODD(efm_n)$, wherein i=0, 1, . . . , x, in order to determine the $ZDSV_n$ of the zero digital sum variation of the current channel-bit symbol $efm_n$, wherein $ZDSV(m_n^i) = PDSV(m_n^i) * (-1)^{ODD(t_0 \sim efm_{n-1})}$ and $ZDSV(efm_n)_i = PDSV(efm_n) * (-1)^{ODD(t_0 \sim m_n i)}$, wherein $ODD(t_0 \sim m_n^i) = ODD(t_0 \sim efm_{n-1}) \oplus ODD(m_n^i)$, wherein $\oplus$ represents the XOR logic operation, the $ZDSV_n^i$ is the zero digital sum variation of the channel-bit symbol $efm_n$ corresponding to the i-th merge-bit symbol of the possible merge-bit symbols, the $ZDSV(m_n^i)$ means a zero digital sum variation of the i-th merge-bit symbol of the possible merge-bit symbols corresponding to the current channel-bit symbol $efm_n$, the $ZDSV(efm_n)_i$ means a zero digital sum variation of the current channel-bit symbol $efm_n$ corresponding to the i-th merge-bit symbol of the possible merge-bit symbols;

(e) $DSV_n^i = ZDSV_n^i + $(initial bias value)$ * ODD(t_0 \sim efm_{n-1})_i$, wherein the $DSV_n^i$ is a digital sum variation of the current channel-bit symbol $efm_n$ corresponding to the i-th merge-bit symbol of the possible merge-bit symbols;

(f) determining a final merge-bit symbol $m_n^j$ in accordance with the absolute value of $DSV_n^i$ and a run time limit, wherein $j \in \{i\}$, wherein i=0,1, . . . , x; and (f) assigning the initial value $ZDSV_{n-1} = ZDSV_n^j$, the $ODD(t_0 \sim efm_{n-1}) = ODD(t_0 \sim efm_n)_j$, and then jumping to step (b).

10. A method for use on a DVD system for computing a digital sum variation (DSV) of a data stream, comprising the steps of:

(a) providing a pre-determined zero digital sum variation initial value $ZDSV_{n-1}$, an initial value $ODD(t_0 \sim efm_{n-1})$ and an initial bias value, the initial bias value is either 1 or −1;

(b) converting the data stream into a plurality of channel-bit symbol $efm_n^i$, wherein i=0, 1, 2, ..., x;

(c) obtaining a partial digital sum variation (PDSV) value $PDSV(efm_n^i)$ and a $ODD(efm_n^i)$ value in accordance with the channel-bit symbol $efm_n^i$, wherein i=0, 1, 2, ..., x;

(d) calculating $ZDSV_n^i = ZDSV_{n-1} + ZDSV(efm_n^i)$ and $ODD(t_0 \sim efm_n^i) = ODD(t_0 \sim efm_{n-1}) \oplus ODD(efm_n^i)$, wherein i=0, 1, ..., x, in order to determine the $ZDSV_n^i$ of the zero digital sum variation of the current channel-bit symbol $efm_n^i$, wherein $ZDSV(efm_n^i) = PDSV(efm_n^i) * (-1)^{ODD(t_0 - efm_{n-1})}$, wherein the $ZDSV_n^i$ is the zero digital sum variation of the i-th channel-bit symbol $efm_n^i$, the $ZDSV(efm_n^i)$ means a zero digital sum variation of the i-th channel-bit symbol $efm_n^i$;

(e) $DSV_n^i = ZDSV_n^i + $ (the initial bias value)$*ODD(t_0 \sim efm_n^i)$, wherein the $DSV_n^i$ is a digital sum variation of the i-th current channel-bit symbol $efm_n^i$;

(f) determining a final merge-bit symbol $efm_n^j$ in accordance with the absolute value of the $DSV_n^i$ and a coding rule, wherein $j \in \{i\}$, wherein i=0, 1, ..., x; and (f) assigning the initial value $ZDSV_{n-1} = ZDSV_n^j$, the $ODD(t_0 \sim efm_{n-1}) = ODD(t_0 \sim efm_n^j)$, and then jumping to step (b).

11. A method for use on a DVD system for computing a digital sum variation (DSV) of a data stream, comprising the steps of:

(a) providing a pre-determined zero digital sum variation initial value $ZDSV_{n-1}$ and an initial value $ODD(t_0 \sim efm_{n-1})$;

(b) converting the data stream into a plurality of channel-bit symbol $efm_n^i$, wherein i=0, 1, 2, ..., x;

(c) obtaining a partial digital sum variation (PDSV) values $PDSV(efm_n^i)$ and a $ODD(efm_n^i)$ values in accordance with the corresponding channel-bit symbol $efm_n^i$, wherein i=0, 1, 2, ..., x;

(d) calculating $ZDSV_n^i = ZDSV_{n-1} + ZDSV(efm_n^i)$ and $ODD(t_0 \sim efm_n^i) = ODD(t_0 \sim efm_{n-1}) \oplus ODD(efm_n^i)$, wherein i=0, 1, ..., x, in order to determine the $ZDSV_n^i$ of the zero digital sum variation of the current channel-bit symbol $efm_n^i$, wherein $ZDSV(efm_n^i) = PDSV(efm_n^i) * (-1)^{ODD(t_0 - efm_{n-1})}$, wherein the $ZDSV_n^i$ is the zero digital sum variation of the i-th channel-bit symbol $efm_n^i$, the $ZDSV(efm_n)_i$ means a zero digital sum variation of the i-th channel-bit symbol $efm_n^i$;

(e) determining a final merge-bit symbol $efm_n^j$ in accordance with the absolute value of the $ZDSV(efm_n^i)$ and a coding rule, wherein $j \in \{i\}$, wherein i=0, 1, ..., x; and (f) assigning the initial value $ZDSV_{n-1} = ZDSV_n^j$, the $ODD(t_0 \sim efm_{n-1}) = ODD(t_0 \sim efm_n^j)$, and then jumping to step (b).

\* \* \* \* \*